United States Patent [19]
Frey et al.

[11] Patent Number: 5,910,858
[45] Date of Patent: Jun. 8, 1999

[54] RETROREFLECTIVE SHEETING WITH COATED BACK SURFACE

[75] Inventors: Cheryl M. Frey, White Bear Lake; Bruce B. Wilson, Woodbury, both of Minn.

[73] Assignee: Minnesota Mining and Manufacturing Company, St. Paul, Minn.

[21] Appl. No.: 08/625,860

[22] Filed: Apr. 1, 1996

[51] Int. Cl.[6] .............................. G02B 5/128; G02B 5/126
[52] U.S. Cl. .......................... 359/534; 359/535; 359/536; 359/539; 359/540
[58] Field of Search .................................... 359/534–542, 359/546, 514, 900; 428/34

[56] References Cited

U.S. PATENT DOCUMENTS

| | | |
|---|---|---|
| 3,176,584 | 4/1965 | De Vries et al. |
| 3,190,178 | 6/1965 | McKenzie |
| 3,689,346 | 9/1972 | Rowland ................................ 156/245 |
| 3,712,706 | 1/1973 | Stamm |
| 3,810,804 | 5/1974 | Rowland ................................ 156/245 |
| 3,811,983 | 5/1974 | Rowland ................................ 156/245 |
| 3,924,929 | 12/1975 | Holmen et al. |
| 4,025,159 | 5/1977 | McGrath |
| 4,111,876 | 9/1978 | Bailey et al. ........................... 260/29.6 |
| 4,123,140 | 10/1978 | Ryan et al. |
| 4,202,600 | 5/1980 | Burke et al. |

(List continued on next page.)

FOREIGN PATENT DOCUMENTS

| | | |
|---|---|---|
| 0 306 161 A2 | 3/1989 | European Pat. Off. |
| 0 306 162 A2 | 3/1989 | European Pat. Off. |
| 0 370 347 B1 | 5/1990 | European Pat. Off. |
| 0 508 173 A1 | 10/1992 | European Pat. Off. |
| 42 11 415 A1 | 10/1993 | Germany |
| 2 254 826 | 10/1992 | United Kingdom |
| 2 255 044 | 10/1992 | United Kingdom |
| 2 267 865 | 12/1993 | United Kingdom |
| WO 95/11468 | 4/1995 | WIPO |
| WO95/11464 | 4/1995 | WIPO |
| WO95/11469 | 4/1995 | WIPO |
| WO 95/07179 | 3/1996 | WIPO |

OTHER PUBLICATIONS

N.S. Allen et al., "UV and electron Beam Curable Pre-Polymers and Diluent Monomers: Classification, Preparation and Properties" in *Radiation Curing in Polymer Science and Technology*—vol. I, *Fundamentals and Methods*; J.P. Fouassier et al., Eds.; Elsevier Applied Science: London; Chapter 5, pp. 225–261 (1993).

*Paint and Surface Coatings, Theory and Practice*; R. Lambourne, Ed.; Ellis Horwood: New York; pp. 58–110 (1987).

"Standard Specifications ad Operating Instructions for Glass Capillary Kinematic Viscometers", ASTM Designation: D 446–93, pp. 170–191 (Jan. 1994).

(List continued on next page.)

*Primary Examiner*—James Phan
*Attorney, Agent, or Firm*—Robert H. Jordan

[57] ABSTRACT

The present invention provides a retroreflective sheeting having a front surface and a back surface, the retroreflective sheeting retroreflecting light entering through the front surface, wherein the retroreflective sheeting comprises encapsulated-lens retroreflectors. The retroreflective sheeting includes a plurality of indentations in the back surface of the retroreflective sheeting and seal coat at least partially filling the indentations.

57 Claims, 3 Drawing Sheets

5,910,858
Page 2

U.S. PATENT DOCUMENTS

| | | | |
|---|---|---|---|
| 4,202,948 | 5/1980 | Peascoe | 525/70 |
| 4,243,618 | 1/1981 | Van Aram | 264/1 |
| 4,327,130 | 4/1982 | Pipkin | 427/209 |
| 4,332,437 | 6/1982 | Searight et al. | |
| 4,332,847 | 6/1982 | Rowland | 428/156 |
| 4,345,543 | 8/1982 | Pipkin | 118/106 |
| 4,349,598 | 9/1982 | White | 428/161 |
| 4,387,124 | 6/1983 | Pipkin | 427/356 |
| 4,391,948 | 7/1983 | Falk et al. | 525/57 |
| 4,393,171 | 7/1983 | Bracke et al. | 525/309 |
| 4,393,172 | 7/1983 | Lindner et al. | 525/310 |
| 4,418,120 | 11/1983 | Kealy et al. | 428/343 |
| 4,436,871 | 3/1984 | Staas | 525/64 |
| 4,438,171 | 3/1984 | Wefer | 428/215 |
| 4,440,825 | 4/1984 | Paddock | 428/318.6 |
| 4,442,144 | 4/1984 | Pipkin | 427/355 |
| 4,444,840 | 4/1984 | Wefer | 428/339 |
| 4,444,841 | 4/1984 | Wheeler | 428/339 |
| 4,522,964 | 6/1985 | Lindner et al. | 524/71 |
| 4,528,328 | 7/1985 | Ranade et al. | 525/71 |
| 4,537,933 | 8/1985 | Walker et al. | 525/71 |
| 4,562,229 | 12/1985 | Walker et al. | 525/71 |
| 4,576,850 | 3/1986 | Martens | 428/156 |
| 4,576,860 | 3/1986 | Fink et al. | 428/314.4 |
| 4,587,297 | 5/1986 | Walker et al. | 525/64 |
| 4,588,258 | 5/1986 | Hoopman | |
| 4,601,861 | 7/1986 | Pricone et al. | 264/1.6 |
| 4,652,274 | 3/1987 | Boettcher et al. | 51/298 |
| 4,653,854 | 3/1987 | Miyata | |
| 4,672,089 | 6/1987 | Pricone et al. | 524/354 |
| 4,731,414 | 3/1988 | Ting | 525/71 |
| 4,751,138 | 6/1988 | Tumey | 428/323 |
| 4,775,219 | 10/1988 | Appeldorn et al. | |
| 4,801,193 | 1/1989 | Martia | |
| 4,831,079 | 5/1989 | Ting | 525/71 |
| 4,880,554 | 11/1989 | Newman et al. | 525/67 |
| 4,880,875 | 11/1989 | Wassmuth et al. | 525/67 |
| 4,885,209 | 12/1989 | Lindner et al. | 428/420 |
| 4,885,335 | 12/1989 | Gallucci et al. | 525/67 |
| 4,894,416 | 1/1990 | Gallucci | 525/74 |
| 4,895,428 | 1/1990 | Nelson et al. | |
| 4,903,440 | 2/1990 | Larson et al. | 51/298 |
| 4,983,436 | 1/1991 | Bailey et al. | 428/40 |
| 4,985,340 | 1/1991 | Palazzotto et al. | 430/270 |
| 5,055,113 | 10/1991 | Larson et al. | 51/298 |
| 5,064,272 | 11/1991 | Bailey et al. | 359/541 |
| 5,066,098 | 11/1991 | Kult et al. | 359/540 |
| 5,068,285 | 11/1991 | Laughner | 525/67 |
| 5,069,964 | 12/1991 | Tolliver et al. | 359/541 |
| 5,070,142 | 12/1991 | Giles, Jr. et al. | 525/66 |
| 5,070,665 | 12/1991 | Marrin et al. | 52/239 |
| 5,082,897 | 1/1992 | Udipi | 525/67 |
| 5,104,934 | 4/1992 | Udipi | 525/67 |
| 5,106,919 | 4/1992 | Canova et al. | 525/234 |
| 5,117,304 | 5/1992 | Huang et al. | 359/529 |
| 5,120,788 | 6/1992 | Seitz et al. | 525/85 |
| 5,162,423 | 11/1992 | Neumann et al. | 524/504 |
| 5,196,480 | 3/1993 | Seitz et al. | 525/71 |
| 5,236,472 | 8/1993 | Kirk et al. | 51/298 |
| 5,272,562 | 12/1993 | Coderre | 359/529 |
| 5,306,548 | 4/1994 | Zabrocki et al. | 428/215 |
| 5,310,436 | 5/1994 | Pricone et al. | 156/209 |
| 5,450,235 | 9/1995 | Smith et al. | 359/529 |
| 5,491,586 | 2/1996 | Phillips | 359/530 |

OTHER PUBLICATIONS

*Radiation Curing Primer I: Inks, Coatings and Adhesives*; C. Kallendorf, Ed.; RadTech International North America: Northbrook, IL; Chap. 4, pp. 45–53 (1990).

R.P. Eckberg, "UV Cure of Epoxysiloxanes" in *Radiation Curing in Polymer Science & Technology; vol. IV*; Fouasser et al., Eds.; Elsevier: New York; Chapter 2, pp. 19–49 (1993).

S. Peeters, "Overview of Dual–Cure and Hybrid–Cure Systems in Radiation Curing" in *Radiation Curing in Polymer Science and Technology; vol. III*; Fouasser et al., Eds.; Elsevier: New York; Chapter 6, pp. 177–217 (1993).

A. Priola et al., "Factors Influencing the Adhesion Properties of Radiation Curable Coatings on Different Substrates", $XIII^{th}$ *International Conference in Organic Coatings Science and Technology*, 303–318 (1987).

*Federation Series on Coatings Technology: Radiation Cured Coatings*; Federation of Societies for Coatings Technology: Philadelphia; pp. 7–13 and 24 (Jun. 1986).

"Standard Test Method for Bond or Cohesive Strength of Sheet Plastics and Electrical Insulating Materials", ASTM Designation: D 952–93, 205–207 (Dec. 1993).

"Standard Test Method for Coefficient of Retroreflection of Retroreflective Sheeting", ASTM Designation: E 810–94, 818–824 (Apr. 1994).

W.L. Hensley et al. in *Federation Series On Coating Techonology: Amino Resins in Coatings*; Federation of Societies for Coatings Technology: Philadelphia; pp. 5–31 (Dec. 1969).

RETROREFLECTIVE SHEETING WITH COATED BACK SURFACE

FIELD OF THE INVENTION

This invention pertains to retroreflective sheetings and methods of making the same.

BACKGROUND OF THE INVENTION

Retroreflective sheeting has the ability to redirect incident light towards its originating source. This advantageous property has led to the wide-spread use of retroreflective sheeting on a variety of articles. Typical examples of retroreflective sheeting are microsphere-based sheeting and cube-corner structured retroreflective sheeting.

Retroreflective sheetings are often provided with a cover sheet intended to protect the retroreflective elements from water, dirt, etc. and to provide effective optical arrangement for retroreflection. A typical embedded-lens retroreflective comprises a monolayer of microspheres embedded in a cover layer. Behind the rear surfaces of the microspheres, separated by a spacing layer, is disposed a reflective layer, e.g., vapor-coated aluminum.

A typical encapsulated-lens retroreflective sheeting comprises a monolayer of microspheres partially embedded in a binder layer with the front surfaces of the microspheres protruding from the binder layer and having a cover film diposed in front of the microspheres, protecting the air to microsphere interface. The rear surfaces of the microspheres have a reflective layer, e.g., vapor-coated aluminum. Examples of encapsulated lens retroreflective sheetings are disclosed, e.g., in U.S. Pat. No. 3,190,178 (McKenzie), U.S. Pat. No. 4,025,159 (McGrath), and U.S. Pat. No. 5,066,098 (Kult).

U.S. Pat. No. 3,176,584 (DeVries et al.) discloses that a reinforcing layer may be incorporated into an embedded lens retroreflective sheeting. The reinforcing layer may be of a similar composition as the binder or space coat material in which the microspheres are embedded. The layer may be applied to the back side of the specularly reflective layer via spraying, i.e., by a solvent-coating technique. Examples of the reinforcing layer materials disclosed include methyl methacrylate, flexible epoxy resins, chloro-sulfonated polyethylene, polystyrene, polypropylene, polycarbonate resin, ethyl cellulose, and cellulose acetate-butyrate. DeVries et al. do not discuss the advantages or usefulness of the reinforcing layer for embedded lens sheeting, except to point out that when applied to the contoured reflecting layer, the reinforcing layer provides a flat surface. The specularly reflecting layers of embedded lens retroreflective sheetings such as those disclosed by DeVries et al. are typically very thin, i.e., on the order of 0.06 microns thick, and must be disposed in special relationship to the microspheres in order for the sheeting to provide useful retroreflection. Because the specularly reflecting layers are typically so thin, they are themselves very fragile and do not provide substantial protection to the spacing layer. Thus, the retroreflectivity of the embedded lens sheeting may be impaired by disturbance of the specularly reflective layer and spacing layer as the reinforcing layer is applied. Such disturbances may be particularly critical where the reinforcing layer is applied with high solvent content or at high temperatures that could deform the spacing layer.

Structured film retroreflectors, such as cube-corner retroreflectors, typically comprise a sheet having a generally planar front surface and an array of structured elements protruding from the back surface. Cube-corner reflecting elements comprise generally trihedral structures that have three approximately mutually perpendicular lateral faces meeting in a single corner. In use, the retroreflector is arranged with the front surface disposed generally toward the anticipated location of intended observers. Light incident to the front surface enters the sheet, passes through the body of the sheet to be internally reflected by the faces of the structured elements so as to exit the front surface in a direction substantially toward the light source (i.e., it is retroreflected).

The light rays are typically reflected at the structured element faces due to either total internal reflection (TIR), or due to specular reflective coatings such as a vapor-deposited aluminum film. Reflectors relying on total internal reflection require an interface between the faces and a material, typically air, having a lower index of refraction. Examples of cube-corner type reflectors are disclosed in U.S. Pat. No. 3,712,706 (Stamm), U.S. Pat. No. 4,025,159 (McGrath), U.S. Pat. No. 4,202,600 (Burke et al.), U.S. Pat. No. 4,243,618 (Van Arnam), U.S. Pat. No. 4,349,598 (White), U.S. Pat. No. 4,576,850 (Martens), U.S. Pat. No. 4,588,258 (Hoopman), U.S. Pat. No. 4,775,219 (Appeldorn et al.), and U.S. Pat. No. 4,895,428 (Nelson et al.). Typically, such retroreflective sheetings exhibit a retroreflective brightness (i.e., a coefficient of retroreflection) of greater than about 50 candela/lux/square meter.

In applications in which the retroreflective sheeting is likely to be exposed to moisture (e.g., outdoors or in high humidity), the microsphere lenses can be protected with a cover film and structured retroreflective elements can be encapsulated with a conformable sealing film, as disclosed in U.S. Pat. No. 4,025,159 (McGrath) and U.S. Pat. No. 5,117,304 (Huang). Conventional sealing/cover films may be single or multi-layer thermoplastic films or thermoplastic/thermoset that are attached to the cube-corner surface or located above the microspheres. In the microsphere retroreflective sheeting, the cover film is peferably light transmissive and it prevents contamination of and/or degradation of the microspheres which would inhibit their ability to retroreflect light. In structured retroreflective sheeting, the sealing film may be either opaque or light transmissive and also maintains an air interface at the backside of the structured elements to maintain retroreflectivity due to the refractive index differential between the structured element material and air. The sealing film also protects the surfaces of the structured elements from degradation caused by environmental exposure.

The sealing/cover films are typically attached to the microsphere-coated base sheeting or the structured retroreflective film using a heated embossing tool to create a cellular pattern (i.e., cells) between the sealing/cover films and the microsphere-coated base sheeting or the structured film. That embossing typically leaves the retroreflective sheetings with uneven back surfaces embossed in the cellular pattern used to attach the sealing/cover films.

That uneven back surface can provide the opportunity for humidity-induced construction buckling when the retroreflective sheeting is attached to a substrate such as a signboard because the indentations in the back surface provide channels into which moisture travels. After the moisture is in place between the sheeting and the substrate, expansion and contraction caused by temperature variations can cause localized delamination of the sheeting from the substrate. Although adhesives typically used to attach the sheeting to the substrate can, to some extent, fill in the indentations and reduce moisture penetration, many do not have sufficient compliance or flexibility to do so completely.

Another disadvantage of embossed retroreflective sheetings is that the indentations formed in the sheeting to emboss the cover sheet may weaken the components in the retroreflective sheeting and/or serve as stress concentrators that decrease the peel strength of the sheetings.

SUMMARY OF THE INVENTION

The present invention provides a retroreflective sheeting having a front surface and a back surface, the retroreflective sheeting retroreflecting light entering through the front surface. The retroreflective sheeting comprises encapsulated-lens retroreflective sheeting with a plurality of indentations in the back surface of the retroreflective sheeting and seal coat at least partially filling the indentations. The seal coat material is preferably prepared from a reactive resin system.

Some preferred reactive seal coat materials are prepared from a free radical radiation curable seal coat precursor. In another aspect, the preferred radiation curable seal coat precursor comprises acrylates. In yet another aspect, the radiation curable seal coat precursor comprises a reactive diluent and a film former.

The present invention also includes methods of manufacturing the various embodiments of the retroreflective sheetings according to the present invention.

The above and other features of retroreflective sheetings according to the invention are more fully shown and described in the drawings and detailed description of this invention, where like reference numerals are used to represent similar parts. It is to be understood, however, that the description and drawings (which are not to scale) are for the purposes of illustration only and should not be read in a manner that would unduly limit the scope of this invention.

DETAILED DESCRIPTION OF THE INVENTION

Figure 1:
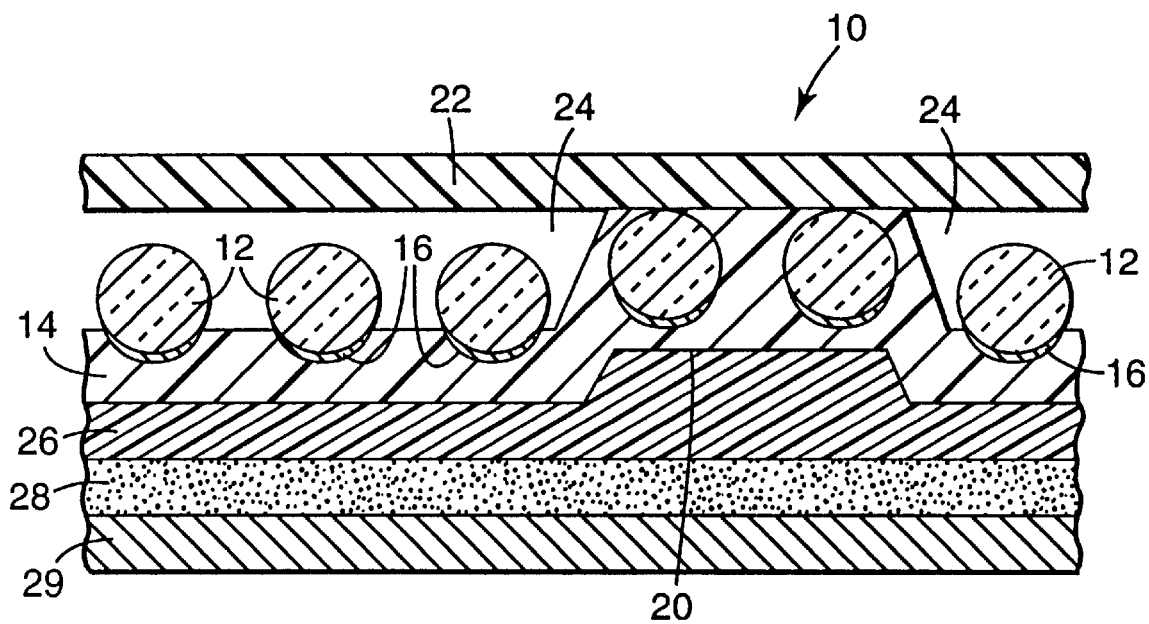
FIG. 1 is a cross-sectional view of one encapsulated-lens retroreflective sheeting according to the present invention.

In describing preferred embodiments of the invention, specific terminology will be used for the sake of clarity. The invention, however, is not intended to be limited to the specific terms so selected, and it is to be understood that each term so selected includes all technical equivalents that operate similarly. Furthermore, the drawings referred to below are merely schematic, showing the relative relationships between the elements of the depicted structures.

The retroreflective sheetings of the present invention have generally good chemical and mechanical durability, and generally good dimensional stability. The encapsulated-lens retroreflective sheetings include those using encapsulated-lens microspheres, as well as structured film retroreflective sheetings as generally taught, for example, in U.S. Pat. No. 3,190,178 (McKenzie), U.S. Pat. No. 4,025,159 (McGrath), U.S. Pat. No. 5,064,272 (Bailey et al.), U.S. Pat. No. 5,272,562 (Coderre), and U.S. Pat. No. 5,450,235 (Smith et al.), as well as PCT Publication No. WO 95/11464 (Benson et al.). The cover films of the encapsulated-lens sheetings protect the microspheres to enhance retroreflection. The sealing films of the cube-corner sheetings protect the structured elements from environmental degradation and also provide a sealed air layer around the structured elements to enhance the total internal reflection of the sheetings. As a result, both types of sheetings, i.e., those using structured elements or microspheres, will be understood by those skilled in the art as being "encapsulated-lens" sheetings because both rely on encapsulating the surfaces of the retroreflective elements, i.e., the lenses, in air to provide the desired refractive index differential for total internal internal reflection.

All of the retroreflective sheetings according to the present invention are bonded, embossed, or otherwise formed in processes that result in the formation of indentations or other discontinuities on the back surface of the sheeting, i.e., the surface that would typically be attached to a substrate such as a signboard. In addition to forming indentations, the forming process, particularly embossing, can redistribute and thin material in the back layer of the sheeting.

As discussed above, those indentations can serve as a focal point for humidity-induced construction buckling. The retroreflective sheetings and methods of manufacturing them according to the present invention address that problem by providing a layer of a seal coat that can be used to at least partially fill the indentations, thereby providing a more uniform back surface to which an adhesive can be applied. By providing a more uniform surface, the incidence of humidity-induced construction buckling can be significantly reduced or eliminated. In addition, the seal coats according to the present invention can also strengthen the sheetings in the areas around the indentations, resulting in a sheeting with increased peel strength.

Another advantage of using a seal coat on the back surface of retroreflective systems according to the present invention is that the additional layer can add opacity to the back surface of the sheetings. That opacity can modify the color of the sheeting and/or the substrate as well as block out any previous graphics/messages on the sign face.

Yet another advantage of the seal coat is that it can be supplied in a range of modulii. A seal coat with a high modulus when cured can be used to add rigidity to the retroreflective sheeting. Conversely, a seal coat with a low modulus when cured can be added to a flexible retroreflective sheeting without significantly reducing the compliance of the sheeting.

Typically, the retroreflective sheetings of the present invention exhibit a retroreflective brightness, i.e., a coefficient of retroreflection, of greater than about 50, preferably, greater than about 100, and more preferably, greater than about 200, candela/lux/square meter, measured according to ASTM Method E 810-94 at an entrance angle of $-4°$ and an observation angle of $-0.2°$, when the sheetings are laying flat.

Referring now to FIG. 1, one embodiment of amicrosphere-based encapsulated-lens retroreflective sheeting 10 is depicted including glass microspheres 12 embedded in a binder layer 14. Each of the microspheres 12 is preferably backed by a layer 16 of aluminum or other reflective material disposed between the encapsulated portion of the microsphere 12 and the binder layer 14. Although the binder layer 14 is depicted as a single layer, it will be understood that the binder layer 14 could include two or more layers of the same or different materials. An example of a multi-layered binder layer 14 that could be used in connection with the present invention is disclosed in U.S. Pat. No. 4,653,854 to Miyata.

The reflective material 16 enhances reflectivity of the sheeting 10. The binder layer 14 is embossed as shown generally at 20 to attach it to the cover film 22 while, at the same time, forming an air space 24 between the microspheres 12 and the cover film 22. That air space 24 enhances retroreflection by providing the proper refractive index differential at the exposed surfaces of the microspheres 12. The actual constructions and methods of manufacturing microsphere-based encapsulated-lens sheetings are described more completely in, for example, U.S. Pat. No. 3,190,178 (McKenzie), U.S. Pat. No. 4,025,159 (McGrath), and U.S. Pat. No. 5,064,272 (Bailey et al.).

As indicated above, the cover film 22 is attached to the binder layer 14 using an embossing process that leaves indentations 20 in the back surface of the binder 14, i.e., the surface opposite the cover film 22. Those indentations 20 are the source of potential humidity-induced construction buckling and initial failure in peel tests. In sheeting 10, however, a seal coat layer 26 is applied to the back surface of the sheeting 10 to at least partially fill the indentations 20, as well as increase the peel strength of the sheeting 10 as described in greater detail below.

After the seal coat layer 26 has been applied to the sheeting 10, a layer of adhesive 28 can be provided on the seal coat layer 26 as a means for attaching the sheeting 10 to a substrate 29. A variety of heat-activated, solvent-activated, pressure-sensitive or other adhesives can be used. In some instances, it may be desirable to use a release liner (not shown) over the adhesive 28 before applying the sheeting 10 to a substrate 29.

It is preferred that the seal coat layer 26 be prepared from a seal coat precursor having the proper viscosity and be applied under the proper conditions to allow it to operate as a "self-leveling" layer. By self-leveling, it is meant that the seal coat precursor is sufficiently fluid such that it seeks to establish a generally planar surface under the forces present during application and curing/hardening. The seal coat precursor and proper application conditions necessary to achieve this feature are discussed more fully below.

Although it is preferred that the seal coat layer 26 form a generally planar surface as depicted in FIG. 1, it should be understood that the seal coats according to the present invention may only partially fill the indentation 20. Although a completely planar back surface is ideal, any reduction in the depth of the indentation 20 by seal coat layer 26 will help to reduce humidity-induced construction buckling by at least partially blocking the passage of moisture between the sheeting 10 and the substrate 29.

Where the binder layer 14 is susceptible to solvents, i.e., exposure to solvents may cause wrinkling and other deformations in the binder layer 14, it may also be desirable that the seal coat material 26 be substantially free of any solvents as applied to the binder layer 14. Examples of binder layers 14 that may be susceptible to damage from solvents include the binder layer materials described in U.S. Pat. No. 3,190,178 (McKenzie), U.S. Pat. No. 4,025,159 (McGrath), and U.S. Pat. No. 5,064,272 (Bailey et al.), and U.S. Pat. No. 5,066,098 (Kult).

As mentioned above, one advantage of the seal coat layer 26 is that the beaded retroreflective sheeting 10 exhibits improved peel strength as compared to beaded sheetings without the seal coat layer. At least a portion of the improved peel strength is the result of a change in the locus of failure in peel strength. This change is schematically depicted in FIGS. 2 and 3.

Figure 2:
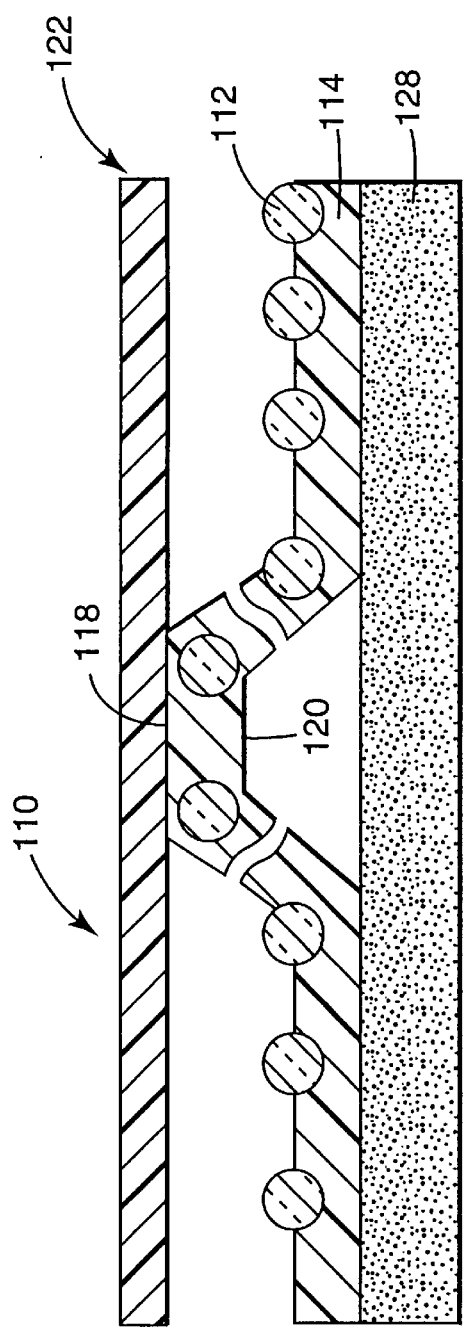
FIG. 2 is a cross-sectional view of the locus of failure in a prior art encapsulated-lens retroreflective sheeting.

In FIG. 2, the prior art sheeting 110 includes a cover film 122 over microspheres 112 located in a binder layer 114. A layer of adhesive 128 is applied to the back side of the binder layer 114 over the indentation 120 in the binder layer 114. Indentation 120 is formed during the process in which the cover film 122 is attached to the sheeting 110.

Indentation 120 is essentially the cross-sectional view of a lengthwise embossed bond 118 formed in the binder layer 114. In peel tests, the binder layer 114 typically fractures adjacent to the bond 118 between the binder layer 114 and cover film 122, leaving substantially all of the binder layer 114 in the bond 118 attached to the cover film 122. In other words, the fracture strength of the binder layer 114 in the areas adjacent to the bond 118 is typically less than the bond between the adhesive 128 and the binder layer 114 in the indentation 120 and the bond 118 between the binder layer 114 and cover film 122.

Figure 3:
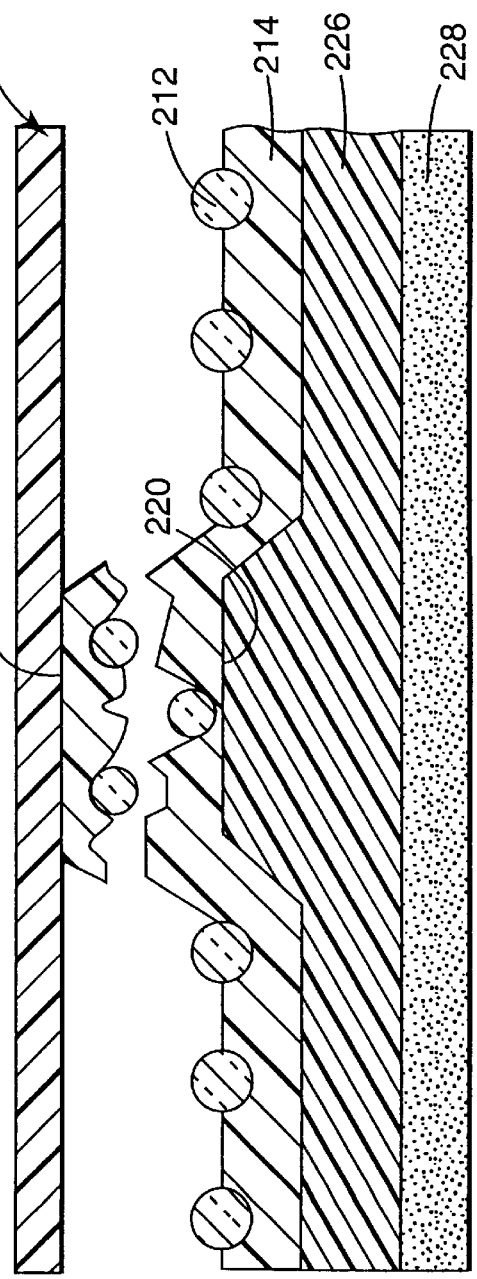
FIG. 3 is a cross-sectional view of the locus of failure in an encapsulated-lens retroreflective sheeting according to the present invention.

FIG. 3 depicts the locus of failure in a sheeting 210 constructed according to the present invention including a cover film 222 over microspheres 212 located in a binder layer 214. Indentation 220 is formed in the binder layer 214 during the process in which the cover film 222 is attached to form the finished sheeting 210. A layer of seal coat material 226 is applied over the back side of the binder layer 214. As discussed above, it is preferred that the seal coat 226 substantially fill the indentation 220, although it may only partially fill the indentation 220. A layer of adhesive 228 is applied to the back side of the seal coat material 226.

As in FIG. 2, indentation 220 is essentially the cross-sectional view of a lengthwise embossed bond 218 between the binder layer 214 and cover film 222. With the addition of the seal coat layer 226, the locus of failure changes in peel tests as shown. Essentially, the bond between binder layer 214 and seal coat 226 across the indentation retains its integrity and the locus of failure moves to within the binder layer 214 itself, resulting in a portion of the binder layer 214 remaining attached to the seal coat 226 and a portion of the binder layer 214 remaining attached to the cover film 222. In other words, the fracture strength of the binder layer layer 214 between the bond 218 and indentation 220 is less than the bond strength of bond 218 between the cover film 222 and the binder layer 214, as well as the bond strength of the bond between the seal coat 226 and the binder layer 214 in the indentation 220. It will be understood that the fracture strength of the binder layer 214 is a function of the material or materials in the binder layer 214 as well as the bond strength between those materials and the microspheres 212 embedded in the binder layer 214 between the bond 218 and indentation 220.

Figure 4:
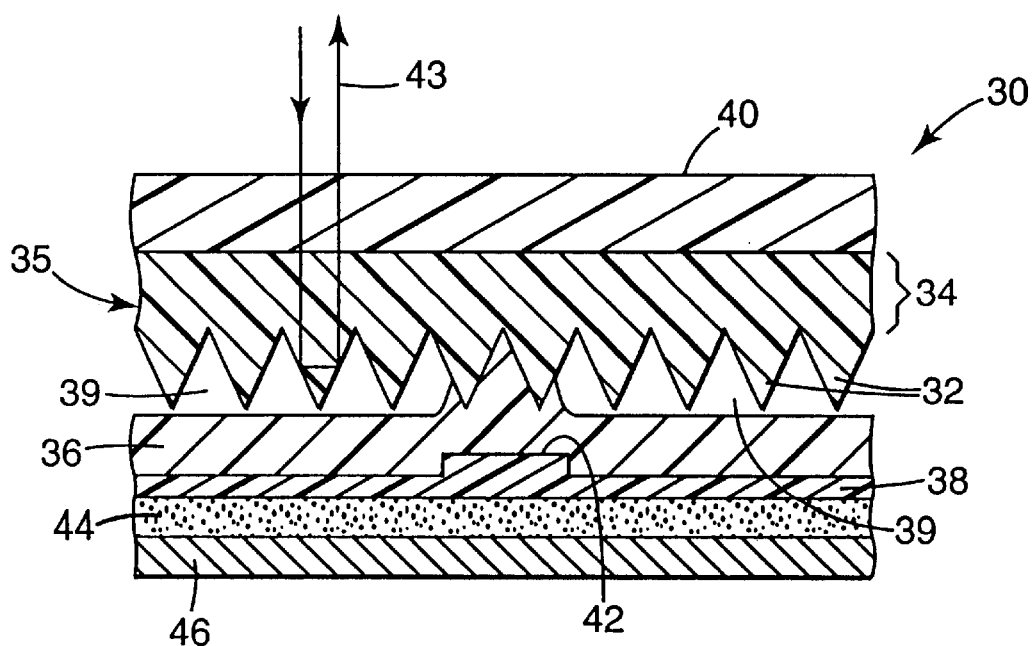
FIG. 4 is a cross-sectional view of one embodiment of a cube-corner retroreflective sheeting according to the present invention.

FIG. 4 schematically depicts a cross-section of one embodiment of an encapsulated-lens sheeting 30 according to the present invention includes a structured retroreflective sheeting. As used herein, "structured retroreflective sheeting" and its variations include all structured films used for retroreflection of incident light. One typical example of a structured retroreflective sheeting is cube-corner retroreflective sheeting and that variation is used in many of the discussions below, but it should be understood that the present invention includes retroreflective sheetings incorporating other geometries in addition to typical cube-corner constructions.

Retroreflective sheeting 30 comprises a cube-corner film 35 including a multitude of cube-corner elements 32 and a body or "land" portion 34, a sealing film 36, a seal coat layer 38 located on the sealing film 36. The sealing film 36 encapsulates the cub-corner elements to protect them from environmental degradation to the cube-corner elements 32 and may also provide additional mechanical integrity to the retroreflective sheeting 30. Examples of encapsulated-lens cube-corner retroreflective sheetings are disclosed in, for example, U.S. Pat. No. 3,924,929 (Holmen et al.), U.S. Pat. No. 4,025,159 (McGrath), U.S. Pat. No. 5,272,562 (Coderre), and U.S. Pat. No. 5,450,235 (Smith et al.), as well as PCT Publication Nos. WO 95/11464 (Benson et al.) and WO 95/11469 (Benson et al.).

FIG. 4 also depicts an optional overlay film 40 located on the front surface of the cube-corner film 35. In a preferred embodiment, the overlay film 40 is the outermost layer on the front side of the sheeting 30. The land portion 34 of the cube-corner film 35 is distinguished from the overlay film 40 as a layer disposed immediately adjacent to the bases of the cube-corner elements 32.

The sealing film 36 in the embodiment depicted in FIG. 4 is bonded to the cube-corner film 35 to form a series of cells that substantially enclose air spaces 39 to encapsulate the elements 32. Those air spaces 39 provide the desired refractive index differential needed at the surfaces of cube-corner elements 32 for total internal reflection of light entering the cube-corner elements 32 through the land portion 34 and/or overlay layer 40.

The heat and/or pressure used to bond the sealing film 36 to the cube-corner film 35 results in the formation of indentations 42 in the back surface of the sealing film 36, i.e., the surface opposite the overlay layer 40. Those indentations 42 are the source of potential humidity-induced construction buckling and may also adversely affect the peel strength of the sheeting 30 as discussed in the background section. In sheeting 30, however, a seal coat layer 38 is applied to the back surface of the sheeting 30 to at least partially fill the indentations 42 and, perhaps, also increase the peel strength of the sheeting 30.

After the seal coat layer 38 has been applied to the sheeting 30, a layer of adhesive 44 can be provided on the layer 38 as a means for attaching the sheeting 30 to a substrate 46. A variety of heat-activated, solvent-activated, pressure-sensitive or other adhesives can be used. In some instances, it may be desirable to use a release liner (not shown) over the adhesive 44 before applying the sheeting 30 to a substrate 46.

It is preferred that the seal coat precursor used for seal coat layer 38 have the proper viscosity and be applied under the proper conditions to allow it to operate as a "self-leveling" layer. By self-leveling, it is meant that the seal coat precursor is sufficiently fluid such that it seeks to establish a generally planar surface under the forces present during application and curing/hardening. The seal coat precursor and proper application conditions necessary to achieve this feature are discussed more fully below.

Although it is preferred that the seal coat layer 38 form a generally planar surface as depicted in FIG. 4, it should be understood that the seal coat according to the present invention may only partially fill the indentation 42. Although a completely planar back surface is ideal, any reduction in the depth of the indentation 42 by seal coat layer 38 will help to reduce humidity-induced construction buckling by at least partially blocking the passage of moisture between the sheeting 30 and the substrate 46. A further way in which the seal coat layer 38 can reduce humidity-induced construction buckling is by increasing the rigidity (where desirable) of the sheeting 30. That increased rigidity can assist the sheeting 30 in resisting deformation caused by trapped moisture, which deformation can lead to adhesive failure as the sheeting 30 is forced away from the substrate 46.

In addition to at least partially filling any indentations 42 in the sealing film 36, the seal coat layer 38 may also increase the peel strength of the composite comprising the sheeting 30, adhesive 44 and substrate 46. In addition to increasing the peel strength, the addition of a seal coat layer 38 can also change the locus of failure. Typically, the sheeting 30 fails in peel strength tests at the interface between the cube-corner film 35 and the sealing film 36. When a sheeting 30 is coated with a layer of seal coat 38, however, the locus of failure in peel strength tests often moves to the interface between the seal coat 38 and the adhesive 44 or the interface between the adhesive 44 and the substrate 46.

Figure 5:
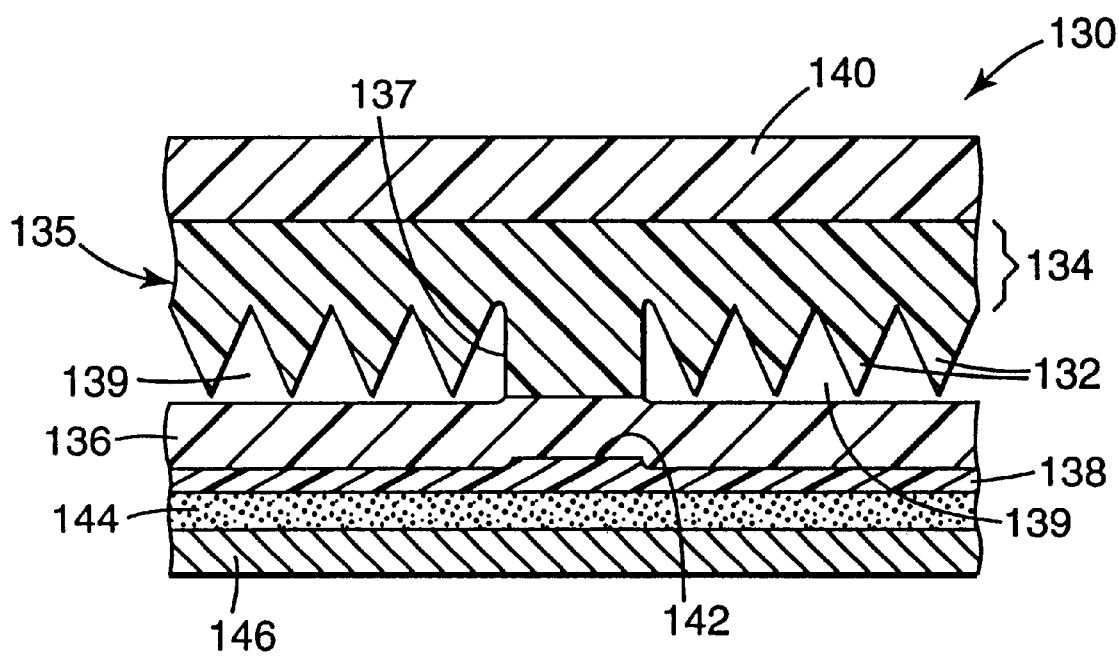
FIG. 5 is a cross-sectional view of an alternative embodiment of a cube-corner retroreflective sheeting according to the present invention.

In a variation of the sheeting 30 depicted in FIG. 2, the sheeting 130 depicted in FIG. 5 includes a raised structure 137 extending from the cube-corner film 135. The sealing film 136 is bonded to the upper surfaces of the raised structure 137 to form air spaces 139 around cube-corner elements 132. As part of the bonding process, an indentation 142 can be formed in the exposed surface of the sealing film 136, i.e., the surface facing away from the cube-corner elements 132. A seal coat layer 138 is applied to the back surface of the sheeting 130 to at least partially fill the indentations 142 and, perhaps, also increase the peel strength of the sheeting 130. U.S. Pat. No. 3,924,929 (Holmen et al.) describes one method of manufacturing cube-corner film 135 with a raised structure 137 (referred to as "septa"). U.S. Pat. No. 4,025,159 (McGrath) and PCT Publication No. WO 95/11469 (Benson et al.) also describe cube-corner films with raised structures and methods of manufacturing them.

After the seal coat layer 138 has been applied to the sheeting 130, a layer of adhesive 144 can be provided on the seal coat layer 138 as a means for attaching the sheeting 130 to a substrate 146. A variety of heat-activated, solvent-activated, pressure-sensitive or other adhesives can be used. In some instances, it may be desirable to use a release liner (not shown) over the adhesive 144 before applying the sheeting 130 to a substrate 146.

The properties of the seal coat precursor used for seal coat layer 138 with respect to leveling are the same as those discussed above for layer 38 in connection with FIG. 4. Likewise, the discussion regarding the ability of seal coat layer 38 to completely or only partially fill the indentation 42 of the embodiment depicted in FIG. 4 also applies to seal coat layer 138 and indentation 142.

Figure 6:
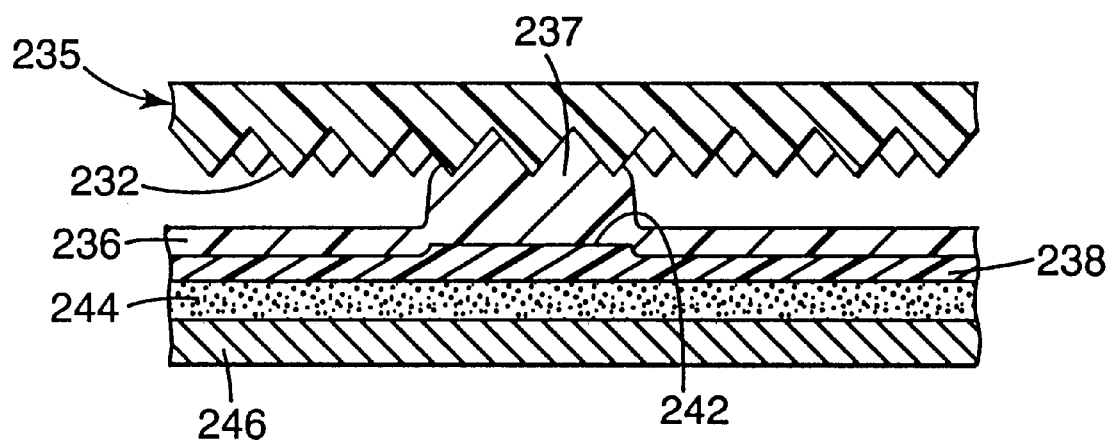
FIG. 6 is a cross-sectional view of an alternative embodiment of a cube-corner retroreflective sheeting according to the present invention.

A further variation on the embodiment depicted in FIG. 5 is shown in FIG. 6. As shown, the sealing film 236 includes a raised structure 237 that is bonded to the cube-corner film 235. The sealing film 236 is still bonded to the cube-corner film 235 using heat and/or pressure that results in the formation of indentations 242 on the back surface of the sealing film 236. Those indentations 242 can also be filled in by a seal coat layer 238 as described above with respect to the embodiments depicted in FIGS. 4 and 5.

Seal Coat

Seal coat is a polymeric/oligomeric material used to coat the sealing films in the sheetings according to the present invention. The seal coat is prepared from a seal coat precursor that is applied as a fluid capable of flowing sufficiently so as to be coatable, and then solidifying to form a film. The solidification can be achieved by curing (i.e., polymerizing and/or crosslinking) or by drying (e.g., or driving off a liquid) and curing. The seal coat precursor can be an organic solvent-borne, water-borne, or 100% solids (i.e., a substantially solvent-free) composition. That is, the seal coat may be formed from a 100% solids formulation or it may be coated out of a solvent (e.g., a ketone, tetrahydrofuran, or water) with subsequent drying and curing. Preferably, the seal coat precursor is a 100% solids formulation, which is substantially solvent-free (i.e., less than about 1 wt-%). By this it is meant that there is less than about 1 wt-% nonreactive diluent (as defined below) present in the seal coat precursor. Thus, the 100% solids seal coat precursors can polymerize and/or crosslink using a wide variety of curing mechanisms (e.g., oxidative cure as a result of oxygen in the air, thermal cure, moisture cure, high energy radiation cure, condensation polymerization, addition polymerization, and combinations thereof) without the need to drive off a solvent.

The seal coat precursor is one that is capable of irreversibly forming a cured oligomeric/polymeric material and is often used interchangeably with the term "thermosetting" precursor. The term "thermosetting" precursor is used herein to refer to reactive systems that irreversibly cure upon the application of heat as well as other sources of energy, such as E-beam, ultraviolet, visible, etc., or with time upon the addition of a chemical catalyst, moisture, and the like. The term "reactive" means that the components of the seal coat precursor react with each other (or self-react) either by polymerizing, crosslinking, or both, using any of the mechanisms listed above.

The seal coat has a variety of functions. Its primary fiction is to at least partially fill the indentations caused by embossing. It may also provide a more compatible layer for the adhesive composition. Furthermore, it can impart additional durability, strength, and opacity to the sheeting. It may also impart additional rigidity to the sheeting.

By at least partially filling any indentations in the back surface, the seal coat may reduce humidity-induced construction buckling between the sheeting and a base such as an aluminum sign plate. Although construction buckling does not affect the performance of the retroreflective sheeting, it can cause localized areas of delamination between the sheeting and the base. The smoother back surface provided by the seal coat, however, can substantially inhibit moisture penetration between the back surface and/or any adhesive used to bond the sheeting to a sign backing because it reduces or eliminates the pathways used by moisture to penetrate between the sheetings and substrates. This is particularly true when the adhesive used to attach the sheeting to the backing is substantially stiff (i.e., when it does not fill in or otherwise conform to and fill any indentations). In addition, if the seal coat imparts additional rigidity to the sheeting, that additional rigidity alone can also assist in preventing humidity-induced construction buckling by mechanically resisting deformation in the sheeting.

Components selected for use in the seal coat precursor preferably interact with the back surface to form a durable bond. The term "interact" refers to a variety of mechanisms of interaction, such as surface roughening, dissolution, or interpenetration of the polymer used to form the back surface of the sheeting. There could also be a covalent interaction (e.g., crosslinking and/or polymerizing) between the seal coat precursor and other layers of the sheeting. The degree of interaction, however, cannot be so great as to destroy the integrity of the retroreflective sheeting.

Certain components can be used to enhance durability and weatherability of the retroreflective sheeting. In addition, the seal coat precursor preferably has suitable rheology to both coat the back surface uniformly and also flow into the indentations resulting from embossing. Additional opacity can be obtained by this invention because components of the seal coat precursor can suspend or disperse various pigments at useful concentrations.

Materials suitable for forming the seal coat are seal coat precursors comprising reactive components, i.e., materials capable of being crosslinked and/or polymerized by a wide variety of mechanisms (e.g., oxidative cure, condensation, moisture cure, radiation or thermal cure of free radical systems, etc., or combinations thereof). Examples include, but are not limited to: amino resins (i.e., aminoplast resins) such as alkylated urea-formaldehyde resins, melamine-formaldehyde resins, and alkylated benzoguanamine-formaldehyde resins; acrylate resins (including acrylates and methacrylates) such as vinyl acrylates, acrylated epoxies, acrylated urethanes, acrylated polyesters, acrylated acrylics, acrylated polyethers, acrylated oils, and acrylated silicones; alkyd resins such as urethane alkyd resins; polyester resins; reactive urethane resins; phenol formaldehyde resins (i.e., phenolic resins) such as resole and novolac resins; phenolic/latex resins; epoxy resins such as bisphenol epoxy resins; isocyanates; isocyanurates; polysiloxane resins including alkylalkoxysilane resins; reactive vinyl resins; and the like. As used herein, "resins" or "resin systems" refer to polydisperse systems containing monomers, oligomers, polymers, or combinations thereof.

Such reactive seal coat precursor components are capable of being cured by a variety of mechanisms (e.g., condensation or addition polymerization) using, for example, thermal energy, radiation energy, etc. Rapidly acting forms of radiation energy (e.g., requiring application for less than five minutes and preferably for less than five seconds) are particularly preferred. Electron beam (E-beam) radiation is especially desired because of its ability to penetrate heavily pigmented coatings, its speed and efficient use of applied energy, and its ease of control. Other useful forms of radiation energy include ultraviolet/visible light, nuclear radiation, infrared, and microwave radiation. Depending on the particular curing mechanism, the seal coat precursor can further include a catalyst, initiator, or curing agent to help initiate and/or accelerate the polymerization and/or crosslinking process.

Reactive seal coat precursor components capable of being cured by thermal energy and/or time with the addition of catalysts include, for example, phenolic resins such as resole and novolac resins; epoxy resins such as bisphenol A epoxy resins; and amino resins such as alkylated urea-formaldehyde resins, melamine-formaldehyde resins, and alkylated benzoguanamine-formaldehyde resins. The seal coat precursors containing reactive components such as these can include free radical thermal initiators, acid catalysts, etc., depending on the resin system. Examples of thermal free radical initiators include peroxides such as benzoyl peroxide and azo compounds. Typically, such reactive seal coat precursor components need temperatures greater than room temperature (i.e., 25–30° C.) to cure, although room-temperature curable systems are known.

Resole phenolic resins have a molar ratio of formaldehyde to phenol, based upon weight, of greater than or equal to about 1:1, typically about 1.5:1.0 to about 3.0:1.0. Novolac resins have a molar ratio of formaldehyde to phenol, based upon weight, of less than about 1:1. Examples of commercially available phenolic resins include those known by the designations DUREZ and VARCUM from Occidental Chemicals Corp., Dallas, Tex.; RESINOX from Monsanto, St. Louis, Mo.; and AEROFENE and AEROTAP from Ashland Chemical Co., Columbus, Ohio.

Epoxy resins have an oxirane and are polymerized by ring opening. They can vary greatly in the nature of their backbones and substituent groups. For example, the backbone may be of any type normally associated with epoxy resins, and the substituent groups may be any group free of an active hydrogen atom that is reactive with an oxirane ring at room temperature. Representative examples of acceptable substituents include halogens, ester groups, ether groups, sulfonate groups, siloxane groups, nitro groups, and phosphate groups. One of the most commonly available epoxy resins is the reaction product of diphenylol propane (i.e., bisphenol A) and epichlorhydrin to form 2,2-bis[4-(2,3-epoxypropoxy)phenyl]propane (a diglycidyl ether of bisphenol A). Such materials are commercially available under the trade designations EPON (e.g., EPON 828, 1004, and 1001F) from Shell Chemical Co., and DER (e.g., DER 331, 332, and 334) from Dow Chemical Co., Midland, Mich. Other suitable epoxy resins include glycidyl ethers of phenol formaldehyde novolac available under the trade designation DEN (e.g., DEN 431 and 428) from Dow Chemical Co.

Amino resins (i.e., aminoplast resins) are the reaction product of formaldehyde and an amine. The amine is typically urea or melamine. The most common amino resins are the alkylated urea-formaldehyde resins and melamine-formaldehyde resins, although alkylated benzoguanamine-formaldehyde resins are also known. Melamine-formaldehyde resins are typically used where outdoor durability and chemical resistance are desired. Typically, however, amino resins are not used by themselves because they tend to be brittle. Thus, they are often combined with other resin systems. For example, they can be combined with alkyds, epoxies, acrylics, or other resins that contain functional groups that will react with the amino resin, to take advantage of the good properties of both resin systems.

More preferred seal coat precursors are those that are curable using radiation. These are referred to herein as radiation curable materials. As used herein, "radiation cure" or "radiation curable" refers to curing mechanisms that involve polymerization and/or crosslinking of resin systems upon exposure to ultraviolet radiation, visible radiation, electron beam radiation, or combinations thereof, optionally with the appropriate catalyst or initiator. Typically, there are two types of radiation cure mechanisms that occur—free radical curing and cationic curing. These usually involve one stage curing or one type of curing mechanism. Mixtures of free radical and cationic materials may also be cured to impart desired properties from both systems. Also possible are dual-cure and hybrid-cure systems, as discussed below.

In cationic systems, cationic photoinitiators react upon exposure to ultraviolet/visible light to decompose to yield an acid catalyst. The acid catalyst propagates a crosslinking reaction via an ionic mechanism. Epoxy resins, particularly cycloaliphatic epoxies, are the most common resins used in cationic curing, although aromatic epoxies and vinyl ether based oligomers can also be used. Furthermore, polyols can be used in cationic curing with epoxies as chain-transfer agents and flexibilizers. Also, epoxysiloxanes as disclosed in Eckberg et al., "UV Cure of Epoxysiloxanes," *Radiation Curing in Polymer Science and Technology: Volume IV,* *Practical Aspects and Applications*, Fouassier and Rabek, eds., Elsevier Applied Science, New York, Chapter 2, 19–49 (1993) can be cured using a cationic photoinitiator. The cationic photoinitiators include salts of onium cations, such as arylsulfonium salts, as well as organometallic salts. Examples of cationic photoinitiators are disclosed in U.S. Pat. No. 4,751,138 (Tumey et al.) and U.S. Pat. No. 4,985,340 (Palazzotti), and European Patent Application Nos. 306,161 and 306,162. A suitable photoinitiator for epoxysiloxanes is the photoactive iodonium salt available under the trade designation UV9310C from GE Silicones, Waterford, N.Y.

In free radical systems, radiation provides very fast and controlled generation of highly reactive species that initiate polymerization of unsaturated materials. Examples of free radical curable materials include, but are not limited to, acrylate resins, aminoplast derivatives having pendant alpha,beta-unsaturated carbonyl groups, isocyanurate derivatives having at least one pendant acrylate group, isocyanate derivatives having at least one pendant acrylate group, unsaturated polyesters (e.g., the condensation products of organic diacids and glycols), polyene/thiol/silicone systems, and other ethylenically unsaturated compounds, and mixtures and combinations thereof. Such radiation curable systems are discussed in greater detail in Allen et al., "UV and Electron Beam Curable Pre-Polymers and Diluent Monomers: Classification, Preparation and Properties," *Radiation Curing in Polymer Science and Technology: Volume I, Fundamentals and Methods,* Fouassier and Rabek, eds., Elsevier Applied Science, New York, Chapter 5, 225–262 (1993); *Federation Series on Coatings Technology: Radiation Cured Coatings,* Federation of Societies for Coatings Technology, Philadelphia, Pa., pages 7–13 (1986); and *Radiation Curing Primer I: Inks, Coatings, and Adhesives,* RadTech International North America, Northbrook, Ill., pages 45–53 (1990).

Free radical curable systems can be cured using radiation energy, although they can be cured using thermal energy, as long as there is a source of free radicals in the system (e.g., peroxide or azo compound). Thus, the phrase "radiation curable," and more particularly the phrase "free radical curable," include within their scope systems that also can be cured using thermal energy and that involve a free radical curing mechanism. In contrast, the phrase "radiation cured" refers to systems that have been cured by exposure to radiation energy.

Suitable acrylate resins for use in the present invention include, but are not limited to, acrylated urethanes (i.e., urethane acrylates), acrylated epoxies (i.e., epoxy acrylates), acrylated polyesters (i.e., polyester acrylates), acrylated acrylics, acrylated silicones, acrylated polyethers (i.e., polyether acrylates), vinyl acrylates, and acrylated oils. As used herein, the terms "acrylate" and "acrylate-functional" include both acrylates and methacrylates, whether they be monomers, oligomers, or polymers.

Acrylated urethanes are diacrylate esters of hydroxy terminated NCO extended polyesters or polyethers. They can be aliphatic or aromatic, although acrylated aliphatic urethanes are preferred because they are less susceptible to weathering. Examples of commercially available acrylated urethanes include those known by the trade designations PHOTOMER (e.g., PHOTOMER 6010) from Henkel Corp., Hoboken, N.J.; EBECRYL 220 (hexafunctional aromatic urethane acrylate of molecular weight 1000), EBECRYL 284 (aliphatic urethane diacrylate of 1200 molecular weight diluted with 1,6-hexanediol diacrylate), EBECRYL 4827 (aromatic urethane diacrylate of 1600 molecular weight), EBECRYL 4830 (aliphatic urethane diacrylate of 1200 molecular weight diluted with tetraethylene glycol diacrylate), EBECRYL 6602 (trifunctional aromatic urethane acrylate of 1300 molecular weight diluted with trimethylolpropane ethoxy triacrylate), and EBECRYL 8402 (aliphatic urethane diacrylate of 1000 molecular weight) from UCB Radcure Inc., Smyrna, Ga.; SARTOMER (e.g., SARTOMER 9635, 9645, 9655, 963-B80, 966-A80) from Sartomer Co., West Chester, Pa.; and UVITHANE (e.g., UVITHANE 782) from Morton International, Chicago, Ill.

Acrylated epoxies are diacrylate esters of epoxy resins, such as the diacrylate esters of bisphenol A epoxy resin. Examples of commercially available acrylated epoxies include those known by the trade designations EBECRYL 600 (bisphenol A epoxy diacrylate of 525 molecular weight), EBECRYL 629 (epoxy novolac acrylate of 550 molecular weight), and EBECRYL 860 (epoxidized soya oil acrylate of 1200 molecular weight) from UCB Radcure Inc., Smyrna, Ga.; and PHOTOMER 3016 (bisphenol A epoxy diacrylate), PHOTOMER 3038 (epoxy acrylate/tripropylene glycol diacrylate blend), PHOTOMER 3071 (modified bisphenol A acrylate), etc. from Henkel Corp., Hoboken, N.J.

Acrylated polyesters are the reaction products of acrylic acid with a dibasic acid/aliphatic/diol-based polyester. Examples of commercially available acrylated polyesters include those known by the trade designations PHOTOMER 5007 (hexafunctional acrylate of 2000 molecular weight), PHOTOMER 5018 (tetrafunctional acrylate of 1000 molecular weight), and other acrylated polyesters in the PHOTOMER 5000 series from Henkel Corp., Hoboken, N.J.; and EBECRYL 80 (tetrafunctional modified polyester acrylate of 1000 molecular weight), EBECRYL 450 (fatty acid modified polyester hexaacrylate), and EBECRYL 830 (hexafunctional polyester acrylate of 1500 molecular weight) from UCB Radcure Inc., Smyrna, Ga.

Acrylated acrylics are acrylic oligomers or polymers that have reactive pendant or terminal acrylic acid groups capable of forming free radicals for subsequent reaction. Examples of commercially available acrylated acrylics include those known by the trade designations EBECRYL 745, 754, 767, 1701, and 1755 from UCB Radcure Inc., Smyrna, Ga.

Acrylated silicones, such as room temperature vulcanized silicones, are silicone-based oligomers or polymers that have reactive pendant or terminal acrylic acid groups capable of forming free radicals for subsequent reaction. These and other acrylates are discussed in Allen et al., "UV and Electron Beam Curable Pre-Polymers and Diluent Monomers: Classification, Preparation and Properties," *Radiation Curing in Polymer Science and Technology: Volume I, Fundamentals and Methods*, Fouassier and Rabek, eds., Elsevier Applied Science, New York, Chapter 5, 225–262 (1993); *Federation Series on Coatings Technology: Radiation Cured Coatings*, Federation of Societies for Coatings Technology, Philadelphia, Pa., pages 7–13 (1986); and *Radiation Curing Primer I: Inks, Coatings, and Adhesives*, RadTech International North America, Northbrook, Ill., pages 45–53 (1990).

Isocyanurate derivatives having at least one pendant acrylate group and isocyanate derivatives having at least one pendant acrylate group are further described in U.S. Pat. No. 4,652,274 (Boetcher et al.). Examples of isocyanurate resins with acrylate groups include a triacrylate of tris(hydroxy ethyl) isocyanurate.

Radiation curable aminoplast resins have at least one pendant alpha,beta-unsaturated carbonyl group per molecule or oligomer. These unsaturated carbonyl groups can be acrylate, methacrylate, or acrylamide type groups. Examples of resins with acrylamide groups include N-(hydroxymethyl)-acrylamide, N,N'-oxydimethylenebisacrylamide, ortho- and para-acrylamidomethylated phenol, acrylamidomethylated phenolic novolac, glycoluril acrylamide, acrylamidomethylated phenol, and combinations thereof. These materials are further described in U.S. Pat. No. 4,903,440 (Larson et al.), U.S. Pat. No. 5,055,113 (Larson et al.), and U.S. Pat. No. 5,236,472 (Kirk et al.).

Other suitable ethylenically unsaturated resins include monomeric, oligomeric, and polymeric compounds, typically containing ester groups, amide groups, and acrylate groups. Such ethylenically unsaturated compounds preferably have a molecular weight of less than about 4,000. They are preferably esters made from the reaction of compounds containing aliphatic monohydroxy groups or aliphatic polyhydroxy groups and unsaturated carboxylic acids, such as acrylic acid, methacrylic acid, itaconic acid, maleic acid, and the like. Representative examples of acrylate resins are listed elsewhere herein. Other ethylenically unsaturated resins include monoallyl, polyallyl, and polymethallyl esters and amides of carboxylic acids, such as diallyl phthalate, diallyl adipate, and N,N-diallyladipamide, as well as styrene, divinyl benzene, vinyl toluene. Still others include tris(2-acryloyloxyethyl)-isocyanurate, 1,3,5-tri(2-methyacryloxyethyl)-s-triazine, acrylamide, methylacrylamide, N-methylacrylamide, N,N-dimethylacrylamide, N-vinylpyrrolidone, and N-vinylpiperidone.

In dual-cure resin systems, the polymerization or crosslinking occur in two separate stages, via either the same or different reaction mechanisms. In hybrid-cure resin systems, two mechanisms of polymerization or crosslinking occur at the same time on exposure to ultraviolet/visible or E-beam radiation. The chemical curing mechanisms that can occur in these systems include, but are not limited to, radical polymerization of acrylic double bonds, radical polymerization of unsaturated polyesters of styrene or other monomers, air drying of allyl functions, cationic curing of vinyl ethers or epoxies, condensation of isocyanates, and acid-catalyzed thermal curing. Thus, the dual-cure and hybrid-cure systems can combine radiation curing with thermal curing, or radiation curing with moisture curing, for example. A combination of E-beam curing with ultraviolet/visible curing is also possible. Combining curing mechanisms can be accomplished, for example, by mixing materials with two types of functionality on one structure or by mixing different materials having one type of functionality. Such systems are discussed in Peeters, "Overview of Dual-Cure and Hybrid-Cure Systems in Radiation Curing," *Radiation Curing in Polymer Science and Technology: Volume III, Polymer Mechanisms*, Fouassier and Rabek, eds., Elsevier Applied Science, New York, Chapter 6, 177–217 (1993).

Of the radiation curable materials, free radical curable materials are preferred. Of these, the acrylates are particularly preferred for use in the seal coat precursors of the present invention. Examples of such materials include, but are not limited to, mono- or multi-functional acrylates (i.e., acrylates and methacrylates), acrylated epoxies, acrylated polyesters, acrylated aromatic or aliphatic urethanes, acrylated acrylics, acrylated silicones, etc., and combinations or blends thereof. These can be monomers or oligomers (i.e., moderately low molecular weight polymers typically containing 2–100 monomer units, and often 2–20 monomer units) of varying molecular weight (e.g., 100–2000 weight average molecular weight). Preferred seal coat precursors include acrylated epoxies, acrylated polyesters, acrylated aromatic or aliphatic urethanes, and acrylated acrylics. More preferred seal coat precursors include acrylated aromatic or aliphatic urethanes, and most preferred seal coat precursors include acrylated aliphatic urethanes.

Free radical radiation curable systems often include oligomers and/or polymers (also often referred to as film formers) that form the backbone of the resultant cured material, and reactive monomers (also often referred to as reactive diluents) for viscosity adjustment of the curable composition. Although the film formers are typically oligomeric or polymeric materials, some monomeric materials are also capable of forming a film. Typically, systems such as these require the use of ultraviolet/visible or E-beam radiation. Ultraviolet/visible curable systems also typically include a photoinitiator. Water or organic solvents can also be used to reduce the viscosity of the system (therefore acting as unreactive diluents), although this typically requires thermal treatment to flash off the solvent. Thus, the seal coat precursors of the present invention preferably do not include water or organic solvents. That is, they are preferably 100% solids formulations.

Preferred seal coat precursors of the present invention include a reactive diluent and a film former. The reactive diluent includes at least one mono- or multi-functional monomeric compound. As used herein, monofunctional means that compound contains one carbon-carbon double bond, and multi-functional means that the compound contains more than one carbon-carbon double bond or another chemically reactive group that can crosslink through condensation. Examples of resins with a carbon-carbon double bond and another chemically reactive group include isocyanatoethyl methacrylate, isobutoxymethyl acrylamide, and methacryloxy propyl trimethoxy silane. Suitable reactive diluents are those typically used in radiation curable systems for controlling viscosity. They are preferably acrylates, although non-acrylates such as n-vinyl pyrrolidone, limonene, and limonene oxide, can also be used, as long as the monomers are ethylenically unsaturated, which provides for their reactivity. The film former includes at least one radiation curable material, such as the mono- or multi-functional oligomeric compounds typically used in radiation curable systems, although thermoplastic polymers can also be used. These thermoplastic polymers may or may not be reactive with the reactive diluent or self-reactive (e.g., internally crosslinkable).

Preferably, the seal coat precursor includes at least one monofunctional monomeric compound and at least one multifunctional oligomeric compound. Most preferably, such seal coat precursors include at least one monofunctional monomeric acrylate having a molecular weight of no greater than about 1000 (preferably, about 100–1000) and at least one multifunctional oligomeric acrylated urethane having a molecular weight of at least about 500, preferably, about 500–7000, and more preferably, about 1000–2000.

Monofunctional monomers typically tend to lower the viscosity of the blend and provide faster penetration into the indented region in the back surface of the sheeting. Multifunctional monomers and oligomers (e.g., diacrylates and triacrylates) typically tend to provide more crosslinked, stronger bonds between layers and within the seal coat. Also, depending on their structures, the multifunctional monomers and oligomers can impart flexibility or rigidity to the seal coat. Acrylated oligomers, preferably acrylated urethane oligomers, impart desirable properties to the coating, such as toughness, hardness, and flexibility.

Examples of suitable monofunctional monomers include, but are not limited to, ethyl acrylate, methyl methacrylate, isooctyl acrylate, oxethylated phenol acrylate, isobornyl acrylate, 2-ethylhexyl acrylate, 2-phenoxyethyl acrylate, 2-(ethoxyethoxy)ethyl acrylate, ethylene glycol methacrylate, tetrahydroxy furfuryl acrylate (THF acrylate), caprolactone acrylate, and methoxy tripropylene glycol monoacrylate. Examples of suitable multifunctional monomers include, but are not limited to, triethylene glycol diacrylate, methoxyethyoxylated trimethylpropane diacrylate, pentaerythritol triacrylate, glycerol triacrylate, glycerol trimethacrylate, glyceryl propoxylate triacrylate, trimethylolpropane propoxylate triacrylate, trimethylolpropane ethoxylate triacrylate, trimethylolpropane trimethacrylate, trimethylolpropane triacrylate, 1,6-hexanediol diacrylate, 1,4-butanediol diacrylate, tetramethylene glycol diacrylate, tripropylene glycol diacrylate, ethylene glycol dimethacrylate, ethylene glycol diacrylate, tetraethylene glycol diacrylate, polyethylene glycol diacrylate, pentaerythritol tetraacrylate, pentaerythritol tetramethacrylate, and 1,6-hexane diacrylate. Other mono- and multi-functional monomers include vinyl acetate, n-vinyl formamide, limonene oxide, and n-vinyl pyrrolidinone. The monomers are available under the trade designations EBECRYL from UCB Radcure Inc., Smyrna, Ga., PHOTOMER from Henkel Corp., Hoboken, N.J., and SARTOMER from Sartomer Co., West Chester, Pa. Limonene oxide is from Aldrich Chemical Co., Milwaukee, Wis. The n-vinyl pyrrolidinone is from Kodak, Rochester, N.Y.

Examples of suitable acrylated oligomers include, but are not limited to, acrylated epoxies, acrylated polyesters, acrylated aromatic or aliphatic urethanes, acrylated silicones, acrylated polyethers, vinyl acrylates, acrylated oils, and acrylated acrylics. Of these, acrylated aromatic or aliphatic urethanes are preferred, and acrylated aliphatic urethanes are more preferred because of their flexibility and weatherability. Examples of some acrylated aliphatic urethanes (i.e., aliphatic urethane acrylates) include those available under the trade designations PHOTOMER 6010 (MW=1500), from Henkel Corp., Hoboken, N.J.; EBECRYL 8401 (MW=1000) and EBECRYL 8402 (MW=1000, urethane diacrylate), from UCB Radcure Inc., Smyrna, Ga.; S-9635, S-9645, and S-9655, all of which contain 25% by weight isobornyl acrylate, and are available from Sartomer Co., West Chester, Pa.; S-963-B80, which contains 20% by weight 1,6-hexanediol diacrylate and is available from Sartomer Co.; and S-966-A80, which contains 20% by weight tripropylene glycol diacrylate and is available from Sartomer Co.

Preferred reactive monomers (i.e., reactive diluents) are those that interact with (e.g., dissolve or swell) the material forming the back surface of the retroreflective sheeting. Such interactions can be readily screened by application of a quantity of the monomer solution to the surface of the film. Priola et al., *Proceedings of the XIII International Conference in Organic Coatings Science and Technology*, Athens, Greece, Jul. 7–11, 1987, pp. 308–318, discloses a watch glass test suitable for this purpose. A positive response is a hazing or dissolving of the substrate in question upon exposure to a drop of the monomer, which indicates that the monomer penetrates or swells the substance, or otherwise interacts with it.

As stated above, a thermoplastic polymer can be used as the film former, either in addition to or in place of the mono- or multi-functional oligomers. Examples of thermoplastic polymers suitable for use as a film former include, but are not limited to: cast polyethers; cast polyesters; cast polyamides; oriented syndiotactic polystyrene, ionomeric ethylene copolymers; plasticized vinyl halide polymers; polyalpha-olefins; polymers of ethylene-propylene-diene monomers ("EPDM"), including ethylene-propylene-nonconjugated diene ternary copolymers grafted with a mixture of styrene and acrylonitrile (also known as acrylonitrile EPDM styrene or "AES"); styrene-acrylonitrile ("SAN") copolymers including graft rubber compositions such as those comprising a crosslinked acrylate rubber substrate (e.g., butyl acrylate) grafted with styrene and acrylonitrile or derivatives thereof (e.g., alpha-methyl styrene and methacrylonitrile) known as "ASA" or acrylate-styrene-acrylonitrile copolymers, and those comprising a substrate of butadiene or copolymers of butadiene and styrene or acrylonitrile grafted with styrene or acrylonitrile or derivatives thereof (e.g., alpha-methyl styrene and methacrylonitrile) known as "ABS" or acrylonitrile-butadiene-styrene copolymers, as well as extractable styrene-acrylonitrile copolymers (i.e., nongraft copolymers) also typically referred to as "ABS" polymers; and combinations or blends thereof. Preferred polymers are those within the styrenic family of multiphase copolymer resins (i.e., a multiphase styrenic thermoplastic copolymer) referred to above as AES, ASA, and ABS, and combinations or blends thereof. Such polymers are disclosed in U.S. Pat. No. 4,444,841 (Wheeler), U.S. Pat. No. 4,202,948 (Peascoe), and U.S. Pat. No. 5,306,548 (Zabrocki et al.).

Commercially available SAN resins include those available under the trade designation TYRIL from Dow Chemical, Midland, Mich. Commercially available ABS resins include those available under the trade designation CYOLAC such as CYOLAC GPX 3800 from General Electric, Pittsfield, Mass. Commercially available polycarbonate/ABS resins include those available under the trade designations PULSE 1350 and 1370 from Dow Chemical Company, Midland, Mich. Commercially available AES and ASA resins, or combinations thereof, include, for example, those available under the trade designations ROVEL from Dow Chemical Company, Midland, Mich., and LORAN S 757 and 797 from BASF Aktiengesellschaft, Ludwigshafen, Fed. Rep. of Germany), CENTREX 833 and 401 from Bayer Plastics, Springfield, Conn., GELOY from General Electric Company, Selkirk, N.Y., VITAX from Hitachi Chemical Company, Tokyo, Japan. It is believed that some commercially available products also have ABS blended therein.

Preferably, these thermoplastic polymers are used in addition to the mono- or multi-functional oligomers as a secondary film former to control the viscosity and rheology of the seal coat precursor and/or to help reduce the amount of shrinkage of the film. Pellets of the various ASA and/or AES resins available under the trade designation CENTREX, for example, are desirable because they will dissolve in a variety of monomers (i.e., reactive diluents), and are radiation curable (e.g., they crosslink upon exposure to ultraviolet/visible radiation). Other thermoplastic polymers can be used, however, that are not reactive either with the reactive diluents or self-reactive. For example, the substantially unreactive thermoplastic acrylate terpolymer used in the binder of U.S. Pat. No. 4,025,159 (McGrath) can be used in the seal coat precursor of the present invention.

The seal coat precursor may contain various solvents other than the diluent monomers discussed above to help solubilize or swell the higher molecular weight reactive resins (e.g., the acrylated oligomers) and/or the polymers that form the back surface of the sheeting. Such solvents are referred to as nonreactive diluents or nonreactive monomers as they do not significantly polymerize or crosslink with the reactive resin components of the seal coat precursor, for example, under the curing conditions of the method of the present invention. Suitable solvents for this purpose include various ketone solvents, tetrahydrofuran, xylene, and the like. Alternatively, and preferably, however, the seal coat precursor is a 100% solids composition as defined above.

Colorants (i.e., pigments and dyes) can also be included in the seal coat precursor if desired. Examples of suitable colorants include $TiO_2$, phthalocyanine blue, carbon black, basic carbonate white lead, zinc oxide, zinc sulfide, antimony oxide, zirconium oxide, lead sulfochromate, bismuth vanadate, bismuth molybdate, as well as other pigments, particularly opaque pigments disclosed in U.S. Pat. No. 5,272,562 (Coderre). The colorant can be used in an amount to impart the desired color, and can be added to the seal coat precursor in a variety of ways. For example, the colorant may be included in the ASA and/or AES pellets as purchased. Typically, and preferably, a pigment is used in the form of a dispersion in, for example, neopentyl glycol diacrylate (available under the trade designation 9WJ, from Penn Color, Doylestown, Pa.).

Preferably, the seal coat precursors include a reactive diluent in an amount of about 5–25 wt-%, based on the weight of the total seal coat precursor. The amounts of the film former and optional pigment in the seal coat precursor depends on the desired opacity, flexibility, viscosity, etc. Preferably, the seal coat precursors include a film former in an amount of about 25–95 wt-%, and pigment in an amount of no greater than about 50 wt-%, based on the total weight of the seal coat precursor.

A photoinitiator is typically included in ultraviolet/visible curable seal coat precursors of the present invention. Illustrative examples of photopolymerization initiators (i.e., photoinitiators) include, but are not limited to, organic peroxides, azo compounds, quinones, benzophenones, nitroso compounds, acryl halides, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof. Specific examples include benzil, methyl o-benzoate, benzoin, benzoin ethyl ether, benzoin isopropyl ether, benzoin isobutyl ether, benzophenone/tertiary amine, acetophenones such as 2,2-diethoxyacetophenone, benzyl methyl ketal, 1-hydroxycyclohexylphenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyl-diphenylphosphine oxide, 2-methyl-1-4(methylthio), phenyl-2-morpholino-1-propanone, bis(2,6-dimethoxybenzoyl)(2,4,4-trimethylpentyl)phosphine oxide, etc. Such photoinitiators include those available under the trade designations DAROCUR 4265 (50:50 blend of 2-hydroxy-2-methyl-1-phenylpropan-1-one and 2,4,6-trimethylbenzoyldiphenylphosphine oxide) and CGI1700 (25:75 blend of bis(2,6-dimethoxybenzoyl)-2,4,4-trimethylpentylphosphine and 2-hydroxy-2-methyl-1-phenylpropan-1-one) available from Ciba-Geigy Corp., Ardsley, N.Y. Typically, a photoinitiator is used in an amount to impart desired reaction rates. Preferably, it is used in an amount of about 0.01–5 wt-%, and more preferably about 0.1–1 wt-%, based on the total weight of the seal coat precursor.

Other additives that can be included within the seal coat precursor are fillers, defoamers, adhesion promoters, flattening agents, wetting agents, slip aids, stabilizers, plasticizers, adhesion promoters, etc. These can be reactive or nonreactive; however, they are typically nonreactive.

Examples of reactive plasticizers are available under the trade designations SARBOX SB-600 and SB-510E35 from Sartomer Co. Typically, such additives are used in amounts to impart desired characteristics. Preferably, they are used in amounts of about 0.01–5 wt-%, and more preferably about 0.1–1 wt-%, based on the total weight of the seal coat precursor.

Any suitable method of applying the seal coat precursor to the back surface can be used in connection with the present invention. Preferably, however, the coating method is one that is capable of causing the seal coat precursor to at least partially fill the indentations caused by the seal legs. The choice of coating method will depend on the viscosity of the seal coat precursor, the depth of the depressions, the desired thickness of the coating, coating speed, etc. Suitable coating methods include knife coating, rod coating, and notch bar coating. The thickness of the seal coat will depend on the viscosity and film build of the seal coat precursor, the type of coater used, and the desired final properties. Typically, wet coating thicknesses of about 10–250 micrometers are used. Some useful methods of applying a layer of the seal coat used in the present invention are described in U.S. Pat. Nos. 4,327,130; 4,345,543; 4,387,124; and 4,442,144 (all to Pipkin).

After the seal coat precursor is coated onto the back surface of the sheeting, it is preferably exposed to an energy source to initiate cure. Examples of suitable and preferred energy sources include thermal energy, and radiation energy. The amount of energy depends upon several factors such as the resin chemistry, the dimensions of the seal coat precursor after it is coated, and the amount and type of optional additives, particularly pigment load. For thermal energy, the temperature is about 30° C. to about 100° C. The exposure time can range from about 5 minutes to over 24 hours, longer times being appropriate for lower temperatures.

Suitable radiation energy sources for use in the invention include electron beam, ultraviolet light, visible light, or combinations thereof. Electron beam radiation, which is also known as ionizing radiation, can be used at an energy level of about 0.1–10 Mrad, preferably, at an energy level of about 3–8 Mrad, and more preferably, about 5–6 Mrad; and at an accelerating voltage level of about 75 KeV to about 5 meV, preferably, at an accelerating voltage level of about 100–300 KeV. Ultraviolet radiation refers to non-particulate radiation having a wavelength within the range of about 200 nanometers to about 400 nanometers. It is preferred that 118–236 watts/cm ultraviolet lights are used. Visible radiation refers to nonparticulate radiation having a wavelength within the range of about 400 nanometers to about 800 nanometers. If radiation energy is employed, some pigment particles and/or other optional additives may absorb the radiation energy to inhibit polymerization of the resin in the seal coat precursor. If this is observed, higher doses of radiation energy and/or higher levels of photoinitiator can be used to the extent needed to compensate for such radiation absorbance. Also, the E-beam accelerating voltage may be increased to thereby increase penetration of the ionizing radiation energy.

EXAMPLES

Features and advantages of the retroreflective sheetings according to the present invention are further illustrated in the examples. It is recognized, however, that while the examples serve this purpose, the particular ingredients and amounts used, as well as other conditions and details, are not to be construed in a manner that would unduly limit the scope of this invention. The following test was used to evaluate samples of cube-corner retroreflective sheeting of the present invention.

Z-Peel Test

The tensile bond Z-peel test is based on ASTM D 952-93. The specimen to be tested is attached between two metal fixtures. For the purposes of the following examples, the test was set up using an upper fixture that was a cubic block of steel 25.4 millimeters on each edge presenting a 6.5 square centimeter surface. A lower fixture was a 1.6 millimeter thick plate of aluminum 5×30.5 centimeters. For the test, a 30 millimeter square piece of the retroreflective sheeting of this invention was covered on the top with a layer of a suitable pressure sensitive tape such as SCOTCH Brand Adhesive Tape No. 419 (commercially available from 3M Company, St. Paul, Minn.), and on the bottom with a pressure sensitive adhesive having a 93:7 ratio of isooctyl acrylate-acrylic acid copolymer crosslinked with a bisamide crosslinker such as disclosed in U.S. Pat. No. 4,418,120 (Kealy et al.) with an intrinsic viscosity of 1.5–1.7 before cross-linking as measured by modified Ostwald 50 viscometer at 20° C. using ASTM D446-93 test method (the "93:7 adhesive"). The No. 419 adhesive tape was conditioned by storing in a desiccator containing calcium carbonate for at least 24 hours prior to use. The sheeting was placed, back side down on the center of the aluminum plate and the metal block was placed on the top side of the sheeting. The sheeting was then trimmed around the edges of the upper block so that a 25.4×25.4 millimeter square of the sample was tested. The assembled sandwich was then compressed with a force of 1900 Newtons for 60 seconds. The steel cube was secured in the upper jaw of a standard tensile testing machine and the aluminum plate was secured along two sides in a lower gripping fixture of the tester. The jaws were rapidly separated at 50 centimeters/minute and the force versus displacement curve was recorded and the peak force was reported.

Example 1

Beaded Retroreflective Sheeting with Radiation Cured Backside Coating (Solvent-Borne)

Retroreflective sheeting was prepared as described in U.S. Pat. No. 4,025,159 (McGrath). The backside of the sheeting was coated using a notch bar coater with the gaps set to 37, 25, and 12 micrometers. The solution used to coat the backside was prepared as described below. It was difficult to get smooth coatings because the solvent (xylene) redissolved some of the terpolymer used in the binder layer in the beaded product. The coated sample was then irradiated at 175 KeV to provide a total dosage of 4 Mrad of irradiation using an Electro Curtain Model CB 300/45/380, manufactured by Energy Sciences, Inc., Wilmington, Mass. The backcoated samples were then tested for bond strength according to the Z-peel test. Test samples that had a uniform appearance could only be taken from areas of the sheeting that had the least attack, and hence lowest film build of seal coat (2.5–7.5 micrometers).

| Ingredient | Parts by weight |
|---|---|
| Thermoplastic acrylic terpolymer (52.5% methyl methacrylate, 43% ethyl acrylate, and 4.5% iso-octyl acrylate) dissolved in xylene at 33.3% solids | 150 |
| Tetraethylene glycol diacrylate (SARTOMER 268) | 33 |
| Rutile titanium dioxide pigment | 42 |
| Stearic Acid | 0.45 |

The coated samples had Z-peel values within a few percentage of the control (no seal coat), and showed the same mode of failure as the control. The film build of the seal coat was not sufficient to fill in the emboss pattern on the backside of the sheeting. Areas of the coated sample with a thicker seal coat exhibited signs that the seal coat attacked the back surface of the sheeting to the point of destroying the integrity of the sheeting.

Example 2

Beaded Retroreflective Sheeting with a Radiation Cured Seal Coat (100% Solids)

Sheeting was prepared as described in Example 1. The backside of the sheeting was coated using a notch bar coater with the gap set to 25 micrometers. The seal coat precursor used to coat the backside was prepared as follows:

| Ingredient | Parts by Weight |
| --- | --- |
| EBECRYL 8402 (aliphatic urethane diacrylate) from UCB Radcure Inc., Smyrna, GA | 50 |
| $TiO_2$ dispersed in neopentyl glycol diacrylate (Dispersion 9WJ) from Penn Color, Doylestown, PA | 25 |
| THF acrylate (SARTOMER 285) from Sartomer Co., West Chester, PA | 25 |

The coated sample was then irradiated by a 175 KeV E-beam to give a dosage of 4 Mrad of irradiation using an Electro Curtain Model CB 300/45/380, manufactured by Energy Sciences, Inc., Wilmington, Mass. A control sample was also made according to Example 1, but was not coated with the seal coat precursor.

Six replicates of the coated sample and control were then tested for bond strength according to the Z-peel test. The peel strength for the coated samples was about 24% greater than that of the control. In addition, the locus of failure was different between the coated samples and the control. As described with respect to FIG. 2, the locus of failure within the prior art (control) was within the binder layer adjacent the sealed region. For the coated samples, the locus of failure was within the binder layer but within the sealed region near the bond of the binder layer to the top film/overlay (as depicted in FIG. 3).

Samples of the coated and uncoated sheeting were laminated with 75 micrometer thick layer of pressure sensitive 93:7 adhesive to 1.2×0.3 meter aluminum panels. The panels were then immersed in a 49° C. water bath for one hour. The panels were removed after one hour and rated for appearance. The back coated sheeting had considerably less wrinkling and blistering than the uncoated control.

Example 3

Thermoplastic Cube-Corner Sheeting with Polyurethane Sealing Film and Radiation Cured Seal Coat (100% Solids)

Molten polycarbonate resin (MAKROLON 2407 supplied by Mobay Corp., Pittsburgh, Pa.) was cast onto a heated microstructured nickel tooling containing microcube prism recesses having a depth of approximately 89 micrometers. The microcube recesses were formed as matched pairs of cube corner elements with the optical axis canted or tilted away from the primary groove, as generally described in U.S. Pat. No. 4,588,258 (Hoopman). The nickel tooling thickness was 508 micrometers and the tooling was heated to 216° C. Molten polycarbonate at a temperature of 288° C. was cast onto the tooling at a pressure of approximately $1.03 \times 10^7$ Pascals to $1.38 \times 10^7$ Pascals for 0.7 second in order to replicate the microcube recesses. Coincident with filling the cube recesses, additional polycarbonate was deposited in a continuous layer above the tooling with a thickness of approximately 104 micrometers.

A previously extruded 50 micrometer thick aliphatic polyester urethane overlay film (Morthane TM PNO3, supplied by Morton International, Seabrook, N.H.) was then laminated onto the top surface face of the continuous polycarbonate land layer when the surface temperature was approximately 190° C. The combined tooling with laminated polycarbonate and aliphatic urethane overlay was then cooled with room temperature air for 18 seconds to a temperature of 70–90° C. allowing the laminate materials to solidify. The laminate sample was then removed from the microstructured tool.

The cube/overlay laminate prepared above was fed into a nip between a steel embossing roll and a 85 durometer rubber roll with a previously extruded white polyurethane sealing film. The sealing film was protected by a 25 micrometer polyester terephthalate film next to the steel embossing roll. The cube/overlay laminate was also protected by a 51 micrometer polyester terephthalate film next to the rubber roll. The previously extruded white sealing film was 51 micrometers thick and was a blend of an aliphatic polyester urethane (Morthane TM PNO3, supplied by Morton International, Seabrook, N.H.) with titanium dioxide (10% by weight). The embossing pattern was of a chain link configuration. The embossing roll surface temperature was 210° C. and the rubber roll surface temperature was 63° C. The rolls were turning at a surface speed of 6.09 meters/minute and the force on the nip was held at 114 Pascals. The polyester terephthalate protective layers were then removed from the sample. This sealed cube corner sheeting was then notch bar coated on the backside with the same solution described in Example 2, and irradiated by an E-beam as described in Example 2.

Coated samples (6 replicates) and control samples (with no seal coat) were then tested for bond strength according to the Z-peel test. The peel strength for the back-coated samples was 45% greater than the control. In addition the locus of failure was different between the coated samples and control. In the control samples, the failure was between the sealing film and the cube-corner elements. In the coated samples, the failure was between the adhesive and the substrate.

Example 4

Thermoset Cube-Corner Sheeting With Polyurethane Sealing Film and Radiation Cured Seal Coat (100% Solids)

A mixture of 1 wt-% of DAROCURE Brand 4265 (50:50 blend of 2-hydroxy-2-methyl-1-phenylpropan-1-one and 2,4,6-trimethylbenzoyl-diphenylphosphine oxide, available from Ciba-Geigy Corp., Ardsley, N.Y.) was added to a resin mixture of 20 wt-% PHOTOMER Brand 3016 (a bisphenol A epoxy diacrylate, available from Henkel Corp., Hoboken, N.J.), 30 wt-% SARTOMER 285 (THF acrylate, available from Sartomer Co., West Chester, Pa.) and 49 wt-% TMPTA, available from Sartomer Co., was used as a resin composition for forming cube-corner elements.

The resin composition was cast onto a tool generating 62.5 micrometers tall cube-corner elements at 57° C. between the tool and an aliphatic polyurethane overlay film (MORTHANE Brand 3429 urethane from Morton International, Inc., Seabrook, N.H.) on 0.050 millimeters polyester terephthalate (PET) carrier film. The rubber nip roll gap was set to minimize the amount of resin composition over the cavities of the tool. The resin was cured through the overlay film and carrier film with one Fusion V bulb (available from AETEK International of Plainfield, Illinois) set at 160 Watts/cm. Feed rate of material through the cure station was controlled to attain the desired degree of curing (exposure to 100–1000 milliJoules/centimeter squared). Upon completion of the microreplication process and removal from the tool, the side of the composite with the cube corner elements was irradiated by a medium-pressure mercury lamp (AETEK International) operating at 80 Watts/cm to provide a post-UV irradiation cure. The cube corner/overlay/carrier web (PET) laminate sample was fed into a nip between a heated steel embossing roll and an 85 durometer rubber roll with a previously extruded white polyurethane sealing film (as described in Example 3) on a 51 micrometer PET carrier web.

The sealing film and embossing conditions were the same as used in Example 3. The sealed cube-corner sheeting was coated with the seal coat precursor described in Example 2 and cured, also as described in Example 2. Coated and uncoated (control) sheetings were tested for bond strength according to the Z-peel test. Peel data for both samples (6 replicates) were identical as was the locus of failure.

Example 5

Thermoplastic Cube-Corner Sheeting With PET Sealing Film and Radiation Cured Seal Coat (100% Solids)

Molten polycarbonate resin (MAKROLON 2407 supplied by Mobay Corp., Pittsburgh, Pa.) was cast onto a heated microstructured nickel tooling containing microcube prism recesses having a depth of approximately 175 micrometers. The microcube recesses were formed as matched pairs of cube corner elements with the optical axis canted or tilted away from the primary groove, as generally described in U.S. Pat. No. 4,588,258 (Hoopman). The nickel tooling thickness was 508 micrometers and the tooling was heated to 216° C. Molten polycarbonate at a temperature of 288° C. was cast onto the tooling at a pressure of approximately $1.03 \times 10^7$ Pascals to $1.38 \times 10^7$ Pascals for 0.7 second in order to replicate the microcube recesses. Coincident with filling the cube recesses, additional polycarbonate was deposited in a continuous layer above the tooling with a thickness of approximately 175 micrometers. The total cube-corner film was approximately 350 micrometers.

A previously extruded 43 micrometer thick impact modified, continuous, poly(methylmethacrylate) overlay film (Plexiglass 60% VO-45 and 40% DR-1000, material supplied by Rohm and Haas Co., Philadelphia, Pa.) was then laminated onto the top surface face of the continuous land layer when the surface temperature was approximately 190.6° C. The combined tooling with laminated polycarbonate and poly(methylacrylate) overlay was then cooled with room temperature air for 18 seconds to a temperature of 71–88° C. allowing the laminate materials to solidify. The laminate sample was then removed from the microstructured tool.

The cube/overlay laminate prepared above was fed into a nip between a steel embossing roll and a 85 durometer rubber roll with a previously extruded PET bilayer sealing film. The PET sealing film was 38 micrometers thick. The bottom layer of the sealing film was 19 micrometers thick and composed of PET with 11% $TiO_2$. The second layer (facing the cube-corner film) was an 80/20 blend of terephthalic acid and isopthalic acid (3M Company, St. Paul. Minn.).

The embossing pattern was a chain link configuration. The embossing roll surface temperature was 215° C. and the rubber roll surface temperature was 63° C. The rolls were turning at a surface speed of 6.09 meters /minute and the force on the nip was held at $6.2 \times 10^6$ Pascals. The sealed cube-corner sheeting was then notch bar coated with the same solution described in Example 2, and irradiated by an E-beam as described in Example 2.

The coated and uncoated samples were then tested for bond strength according to the Z-peel test. The peel strength for the coated samples was 68% less than that of the control because there was not a good interaction formed between the seal coat and the sealing film. The locus of failure was between the seal coat and the seal film. Monomer spot testing of the seal film showed that the PET was not interacting with any of the ingredients in the seal coat.

The patents, patent documents, and publications cited herein are incorporated by reference in their entirety, as if each were individually incorporated by reference. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A retroreflective article comprising:
   a) encapsulated-lens retroreflective sheeting having a front surface and a back surface, the retroreflective sheeting retroreflecting light entering through the front surface;
   b) a plurality of indentations in the back surface of the retroreflective sheeting; and
   c) seal coat located on the back surface of the retroreflective sheeting, wherein the seal material interacts with the back surface and at least partially fills the indentations in the back surface to form a uniform back surface of the retroreflective sheeting: wherein the seal coat is prepared from a seal coat precursor comprising a radiation curable component; wherein the radiation curable component comprises a cationic curable resin, a free radical curable resin, or mixtures thereof.

2. A retroreflective article comprising:
   a) encapsulated-lens retroreflective sheeting having a front surface and a back surface, the retroreflective sheeting retroreflecting light entering through the front surface;
   b) a plurality of indentations in the back surface of the retroreflective sheeting; and
   c) seal coat located on the back surface of the retroreflective sheeting, wherein the seal material interacts with the back surface and at least partially fills the indentations in the back surface to form a uniform back surface of the retroreflective sheeting: wherein the seal coat is prepared from a seal coat precursor comprising a radiation curable component; wherein the radiation curable component comprises a dual-cure resin or a hybridcure resin.

3. A retroreflective article comprising:
a) encapsulated-lens retroreflective sheeting having a front surface and a back surface, the retroreflective sheeting retroreflecting light entering through the front surface;
b) a plurality of indentations in the back surface of the retroreflective sheeting; and
c) seal coat located on the back surface of the retroreflective sheeting, wherein the seal material interacts with the back surface and at least partially fills the indentations in the back surface to form a uniform back surface of the retroreflective sheeting: wherein the seal coat is prepared from a seal coat precursor comprising a radiation curable component; wherein the radiation curable component comprises an acrylate.

4. A retroreflective article according to claim 3, wherein the acrylate is selected from the group consisting of an acrylated epoxy, an acrylated polyester, an acrylated aromatic or aliphatic urethane, an acrylated acrylic, an acrylated silicone, an acrylated polyether, a vinyl acrylate, and an acrylated oil.

5. A retroreflective article according to claim 3, wherein the acrylate is an acrylated aliphatic or aromatic urethane.

6. A retroreflective article according to claim 3, wherein the acrylate is an acrylated aliphatic urethane.

7. A retroreflective article according to claim 6, wherein the seal coat precursor comprises a monofunctional or multifunctional reactive monomer.

8. A retroreflective article according to claim 7, wherein the monofunctional or multifunctional reactive monomer is an acrylate monomer.

9. A retroreflective article comprising:
a) encapsulated-lens retroreflective sheeting having a front surface and a back surface, the retroreflective sheeting retroreflecting light entering through the front surface;
b) a plurality of indentations in the back surface of the retroreflective sheeting; and
c) seal coat located on the back surface of the retroreflective sheeting, the seal coat at least partially filling the indentations in the back surface of the retroreflective sheeting, and wherein the seal coat is prepared from a seal coat precursor comprising a free radical radiation curable component.

10. A retroreflective article according to claim 9, wherein the seal coat precursor comprises a reactive diluent and a film former.

11. A retroreflective article according to claim 10, wherein the reactive diluent comprises a monofunctional or multifunctional acrylate monomer.

12. A retroreflective article according to claim 11, wherein the film former comprises a thermoplastic polymer.

13. A retroreflective article according to claim 11, wherein the film former comprises a monofunctional or multifunctional acrylate oligomer.

14. A retroreflective article according to claim 13, wherein the radiation curable seal coat precursor further comprises a multiphase styrenic thermoplastic copolymer.

15. A method of manufacturing retroreflective article comprising:
a) providing encapsulated-lens retroreflective sheeting having a front surface and a back surface, wherein light enters through the front surface, wherein the back surface includes a plurality of indentations; and
b) at least partially filling the indentations with a seal coat precursor comprising a free radical radiation curable component.

16. A retroreflective article comprising:
a) retroreflective sheeting comprising encapsulated lens retroreflectors located in a binder layer;
b) a cover film bonded to a front surface of the binder layer between the encapsulated lens retroreflectors;
c) a plurality of indentations in a back surface of the binder layer, the indentations generally corresponding to the bonds between the binder layer and the cover film;
d) seal coat located on the back surface of the binder layer, the seal coat at least partially filling the indentations, wherein the bond strength between the cover film and the front surface of the binder layer and the bond strength between the seal coat and the back surface of the binder layer are both generally greater than the fracture strength of the binder layer between those bonds.

17. A retroreflective article according to claim 16, wherein the seal coat is prepared from a seal coat precursor comprising a thermally curable component.

18. A retroreflective article according to claim 16, wherein the seal coat is prepared from substantially solvent-free components.

19. A retroreflective article according to claim 16, wherein the seal coat is prepared from a precursor comprising a radiation curable component.

20. A retroreflective article according to claim 19, wherein the radiation curable component comprises a cationic curable resin, a free radical curable resin, or mixtures thereof.

21. A retroreflective article according to claim 19, wherein the radiation curable component comprises a dual-cure resin or a hybrid-cure resin.

22. A retroreflective article according to claim 16, wherein the seal coat is prepared from a precursor comprising a monofunctional or multifunctional reactive monomer.

23. A retroreflective article according to claim 22, wherein the monofunctional or multifunctional reactive monomer is an acrylate monomer.

24. A retroreflective article comprising:
a) retroreflective sheeting comprising encapsulated-lens microsphere retroreflectors located in binder layer;
b) a cover film bonded to a front surface of the binder layer between the encapsulated lens retroreflectors;
c) a plurality of indentations in a back surface of the binder layer, the indentations generally corresponding to the bonds between the binder layer and the cover film;
d) seal coat located on the back surface of the binder layer, the seal coat at least partially filling the indentations, the seal coat being prepared from a substantially solvent-free precursor comprising a radiation curable component, wherein the bond strength between the cover film and the front surface of the binder layer and the bond strength between the seal coat and the back surface of the binder layer are both generally greater than the fracture strength of the binder layer between those bonds.

25. A method of applying a seal coat to a retroreflective sheeting comprising the steps of:

a) supplying a retroreflective article comprising:
   i) encapsulated-lens retroreflective sheeting having a front surface and a back surface, the retroreflective sheeting capable of retroreflecting light entering through the front surface; and
   ii) a plurality of indentations in the back surface of the retroreflective sheeting;
b) applying a fluid seal coat precursor to the back surface of the retroreflective sheeting such that the seal coat precursor at least partially fills at least a portion of the indentations; and
c) solidifying the seal coat precursor to form a seal coat.

26. The method according to claim 25, wherein the seal coat is prepared from a seal coat precursor comprising a radiation curable component.

27. The method of claim 25 wherein the seal coat comprises a film after solidifying the seal coat precursor.

28. The method of claim 25 wherein the step of solidifying comprises curing the seal coat precursor to form a seal coat.

29. The method of claim 28 wherein curing the seal coat precursor to form a seal coat comprises exposing the seal coat precursor to an energy source.

30. The method of claim 29 wherein the energy source is selected from the group of electron beam, ultraviolet light, visible light, or combinations thereof.

31. A method according to claim 25, wherein the seal coat precursor comprises a 100% solids composition and the step of solidifying comprises curing the 100% solids seal coat precursor upon the application of heat, electron-beam, ultraviolet, or visible radiation.

32. A retroreflective article comprising:
   a) encapsulated-lens retroreflective sheeting having a front surface and a back surface, the retroreflective sheeting retroreflecting light entering through the front surface;
   b) a plurality of indentations in the back surface of the retroreflective sheeting; and
   c) seal coat at least partially filling the indentations in the back surface of the retroreflective sheeting to form a more uniform back surface, wherein the seal coat comprises an acrylate and interacts with the back surface.

33. A retroreflective article according to claim 32, wherein the acryate seal coat is prepared from monomers, oligomers, polymers, or combinations thereof.

34. A retroreflective article according to claim 32, wherein the acrylate seal coat is prepared from acrylic acid, methacrylic acid, itaconic acid, maleic acid, or combinations thereof.

35. A retroreflective article according to claim 32, wherein the acrylate seal coat is prepared from monofunctional acrylates, multifunctional acrylates, acrylated acrylics, or combinations thereof.

36. A retroreflective article according to claim 32, wherein the acrylate seal coat is prepared from a film former.

37. A retroreflective article according to claim 36, wherein the acrylate seal coat is prepared from a reactive diluent and a film former.

38. A retroreflective article according to claim 37, wherein the reactive diluent comprises at least one monofunctional monomeric compound or at least one multifunctional monomeric compound.

39. A retroreflective article according to claim 38, wherein the monofunctional monomeric compound is selected from the group of ethyl acrylate, methyl methacrylate, isooctyl acrylate, oxethylated phenol acrylate, isobornyl acrylate, 2-ethylhexyl acrylate, 2-phenoxyethyl acrylate, 2-(ethoxyethoxy)ethyl acrylate, ethylene glycol methacrylate, tetrahydroxy furfuryl acrylate (THF acrylate), caprolactone acrylate, methoxy tripropylene glycol monoacrylate, or combinations thereof.

40. A retroreflective article according to claim 38, wherein the multifunctional monomeric compound is selected from the group of triethylene glycol diacrylate, methoxyethyoxylated trimethylpropane diacrylate, pentaerythritol triacrylate, glycerol triacrylate, glycerol trimethacrylate, glyceryl propoxylate triacrylate, trimethylolpropane propoxylate triacrylate, trimethylolpropane ethoxylate triacrylate, trimethylolpropane trimethacrylate, trimethylolpropane triacrylate, 1,6-hexanediol diacrylate, 1,4-butanediol diacrylate, tetramethylene glycol diacrylate, tripropylene glycol diacrylate, ethylene glycol dimethacrylate, ethylene glycol diacrylate, tetraethylene glycol diacrylate, polyethylene glycol diacrylate, pentaerythritol tetraacrylate, pentaerythritol tetramethacrylate, 1,6-hexane diacrylate, isocyanatoethyl methacrylate, isobutoxymethyl acrylamide, methacryloxy propyl trimethoxy silane, or combinations thereof.

41. A retroreflective article according to claim 37, wherein the film former comprises a monofunctional or multifunctional acrylated oligomer.

42. A retroreflective article according to claim 32, wherein the acrylate seal coat is prepared from at least one monofunctional monomeric compound and at least one multifunctional oligomeric compound.

43. A retroreflective article according to claim 32, wherein the acrylate seal coat is prepared from a 100% solids composition.

44. A retroreflective article according to claim 32, wherein the acrylate seal coat precursor interacts with the back surface.

45. A method of manufacturing retroreflective article comprising:
   a) providing encapsulated-lens retroreflective sheeting having a front surface and a back surface, wherein light enters through the front surface, wherein the back surface includes a plurality of indentations;
   b) at least partially filling the indentations with a fluid seal coat precursor comprising a 100% solids composition; and
   c) solidifying the seal coat precursor to form a seal coat.

46. A method according to claim 45, wherein the 100% solids seal coat precursor comprises a free radical radiation curable component.

47. A method according to claim 45, wherein the 100% solids seal coat precursor comprises acrylic acid, methacrylic acid, itaconic acid, maleic acid, or combinations thereof.

48. A method according to claim 45, wherein the 100% solids seal coat precursor comprises mono-functional acrylates, multi-functional acrylates, acrylated acrylics, or combinations thereof.

49. A method according to claim 45, wherein the 100% solids seal coat precursor comprises a film former.

50. A method according to claim 49, wherein the 100% solids seal coat precursor comprises a reactive diluent and a film former.

51. A method according to claim 50, wherein the reactive diluent comprises at least one monofunctional monomeric compound or at least one multifunctional monomeric compound.

52. A method according to claim 51, wherein the monofunctional monomeric compound is selected from the group of ethyl acrylate, methyl methacrylate, isooctyl acrylate, oxethylated phenol acrylate, isobornyl acrylate, 2-ethylhexyl acrylate, 2-phenoxyethyl acrylate, 2-(ethoxyethoxy)ethyl acrylate, ethylene glycol methacrylate, tetrahydroxy furfuryl acrylate (THF acrylate), caprolactone acrylate, methoxy tripropylene glycol monoacrylate, or combinations thereof.

53. A method according to claim 51, wherein the multifunctional monomeric compound is selected from the group of triethylene glycol diacrylate, methoxyethyoxylated trimethylpropane diacrylate, pentaerythritol triacrylate, glycerol triacrylate, glycerol trimethacrylate, glyceryl propoxylate triacrylate, trimethylolpropane propoxylate triacrylate, trimethylolpropane ethoxylate triacrylate, trimethylolpropane trimethacrylate, trimethylolpropane triacrylate, 1,6-hexanediol diacrylate, 1,4-butanediol diacrylate, tetramethylene glycol diacrylate, tripropylene glycol diacrylate, ethylene glycol dimethacrylate, ethylene glycol diacrylate, tetraethylene glycol diacrylate, polyethylene glycol diacrylate, pentaerythritol tetraacrylate, pentaerythritol tetramethacrylate, 1,6-hexane diacrylate, isocyanatoethyl methacrylate, isobutoxymethyl acrylamide, methacryloxy propyl trimethoxy silane, or combinations thereof.

54. A method according to claim 51, wherein the film former comprises a monofunctional or multifunctional acrylated oligomer.

55. A method according to claim 45, wherein the 100% solids seal coat precursor comprises at least one monofunctional monomeric compound and at least one multifunctional oligomeric compound.

56. A method according to claim 45, wherein the 100% solids seal coat precursor comprises an acrylate.

57. A method according to claim 45, wherein the step of solidifying comprises curing the 100% solids seal coat precursor upon the application of heat, electron-beam, ultraviolet, or visible radiation.

* * * * *